(12) United States Patent
Clark

(10) Patent No.: US 11,915,288 B2
(45) Date of Patent: Feb. 27, 2024

(54) USEFUL AND NOVEL SHOPPING APPLICATION

(71) Applicant: Noww, Inc., Houston, TX (US)

(72) Inventor: Jo Anne Kauffman Clark, Houston, TX (US)

( * ) Notice: Subject to any disclaimer, the term of this patent is extended or adjusted under 35 U.S.C. 154(b) by 14 days.

(21) Appl. No.: 16/389,028

(22) Filed: Apr. 19, 2019

(65) Prior Publication Data

US 2019/0325498 A1    Oct. 24, 2019

Related U.S. Application Data

(60) Provisional application No. 62/660,805, filed on Apr. 20, 2018.

(51) Int. Cl.
| | |
|---|---|
| G06Q 30/00 | (2023.01) |
| G06K 7/14 | (2006.01) |
| G06Q 30/0601 | (2023.01) |
| G06T 19/00 | (2011.01) |
| G10L 15/18 | (2013.01) |
| H04L 67/306 | (2022.01) |

(52) U.S. Cl.
CPC ....... *G06Q 30/0625* (2013.01); *G06K 7/1417* (2013.01); *G06Q 30/0643* (2013.01); *G06T 19/006* (2013.01); *G10L 15/18* (2013.01); *H04L 67/306* (2013.01)

(58) Field of Classification Search
CPC ......... G06Q 30/06–08; G06Q 30/0625; G06Q 30/0643; G06K 7/1417; G06T 19/006; G10L 15/18; H04L 67/306
See application file for complete search history.

(56) References Cited

U.S. PATENT DOCUMENTS

| | | | |
|---|---|---|---|
| 6,285,393 | B1 | 9/2001 | Shimoura et al. |
| 6,629,135 | B1 | 9/2003 | Ross, Jr. et al. |
| 7,831,087 | B2 | 11/2010 | Harville |
| 8,510,298 | B2 | 8/2013 | Khandelwal |
| 8,670,979 | B2 | 3/2014 | Gruber et al. |
| 2008/0201113 | A1* | 8/2008 | Stenacker .............. G06F 30/20 703/1 |
| 2009/0319388 | A1* | 12/2009 | Yuan .................. G06Q 30/0603 705/26.1 |

(Continued)

OTHER PUBLICATIONS

Google says machine learning is the future. So I tried it myself, Alex Hern Jun. 28, 2016; (Year: 2016).*

(Continued)

*Primary Examiner* — Robert M Pond
(74) *Attorney, Agent, or Firm* — Kearney, McWilliams & Davis, PLLC; William Yarbrough, III

(57) ABSTRACT

This disclosure is directed to systems, methods, and machine readable media for facilitating online purchasing. In general, techniques are disclosed to facilitate online and mobile purchasing. The disclosure includes technology that allows an agnostic shopping experience, i.e., the shopping may occur on a vendor neutral platform. According to one or more embodiments, facilitating online purchasing may allow a person to purchase correctly sized products or products suited to the need, more conveniently, more consistently, more cheaply and more easily. The more accurate or correct shopping of products saves the wasting of resources required in return shipments and replacement shipments and packaging.

24 Claims, 18 Drawing Sheets

(56) References Cited

U.S. PATENT DOCUMENTS

| | | | |
|---|---|---|---|
| 2011/0022965 A1* | 1/2011 | Lawrence | G06F 3/011 |
| | | | 715/747 |
| 2014/0172917 A1* | 6/2014 | Coroy | G06F 21/6218 |
| | | | 707/783 |
| 2015/0242932 A1* | 8/2015 | Beguin | G06Q 30/06 |
| | | | 705/26.8 |
| 2017/0078304 A1* | 3/2017 | Zhou | H04L 63/205 |
| 2019/0028277 A1* | 1/2019 | Jayachandran | H04L 9/085 |
| 2019/0311108 A1* | 10/2019 | Achkir | G06F 21/57 |

OTHER PUBLICATIONS

Recommended For You: How machine learning helps you choose what to consume next, Jennifer Wei, Aug. 28, 2017; (Year: 2017).*
Machine Learning: What it is and why it matters, SAS, Jan. 7, 2014. (Year: 2014).*

* cited by examiner

USER PROFILE CATEGORIES
Suggested embodiment

User:   age               waist size           skin tone (for skin products)
        Sex               chest
        Weight          hips
        Hight            Hair color
        Body mass index  eye color Clothing:                          glove size
            Dress size                ring size
            Neck size                 vision
            Sleeve length
            Pant length
            Shoe size
                  Foot length
                  Width
                  Instep User closet
        Images
        Inventory
            Objects  Size     Color, etc.

User home
        Rooms (type/function) images
            Living room
            Etc.
        Size/dimensions
        Window/doors/closet doors size and location
        Ceiling height
        Electrical outlet/cable outlet locations per room
        Room trim/molding color and style
        Floor (wood & type/color, carpet type & color, rugs, etc.)
        Room wall coverings (paint, paper, paneling)
        Closets images & size
        Garage
        Refrigerator/Pantry inventory Furniture
        Inventory
        Images
        Type/style (colonial, mid-century, modern, Queen Anne, etc.)
        Color
        Covering (leather, cloth, metal, etc)
        Size
        Location
        Objet d'art
            Size, color, shape, location etc.

FIG. 14

USEFUL AND NOVEL SHOPPING APPLICATION

RELATED APPLICATION

This application claims priority to Provisional Application No. 62/660,805 filed Apr. 20, 2018 and entitled A Useful and Novel Shopping Application, and which is incorporated herein by reference in its entirety.

BACKGROUND

This disclosure relates generally to the field of facilitating online, digital, mobile, retail purchasing and the like. Many factors contribute to the frustration of online purchasing today. For example, middlemen, sizing, pricing, shipping, color, finish, texture, availability, material quality, authenticity, and many other attributes may vary considerably from vendor to vendor and search results are too often ad-driven. The result is that people inadvertently purchase products poorly suited to their needs, forcing them to return or exchange the products and must oftentimes pay multiple shipping and handling fees.

Further, people pay more than necessary for products, especially in the case of fake or pirated products. In fact, people are purchasing from mega-platforms that have been proven to not offer authentic products and are misled about the the origin and the seller; and are unaware the products are subject to in-platform arbitrage from resellers (pushing up the price).

Oftentimes, there are too many steps between identifying an item of interest and receiving the product, with no way to ensure the identified item of interest fits the need or is authentic and available at the published price. It can be difficult to search for or find multiple similar options of a desired product. It is also difficult to "organically" purchase items utilizing a "blank page search screen" or search factual product information or information regarding unadvertised products. Accessibility of information can be problematic and, in some cases, is inhibited by intrusive or voluminous paid search advertising. Also purchasing meaningful or appropriate gifts can be a challenge when preferences or sizes are estimated. There are currently no ways to easily identify, save, and purchase products "in the wild," outside of the retail or traditional online environment except from an in-home Internet of Things (hereinafter "ioT") device, which is not as detailed as needed.

During the purchasing people have not been able to get advice or opinions on online products or to clearly visualize the products on themselves or others (e.g., gift recipient) or in an environment. Oftentimes people know what they like but need ideas, concepts, products and services curated or "pushed" to them. People often buy products they cannot use and don't have a frictionless way to repurpose them. People do not have time to extensively search for or shop for items and services and may need "experts" to consult, curate, or even send them products or services based on their preferences if they request or permit.

Also it is not easy to search the Internet, etc., for a product similar or identical to an object observed on others or seen in a public space. When these items can be searched, the user is typically directed to a vendor specific website (as opposed to an item page).

Both consumers and businesses often purchase products or procurement items through distributors, retailers or platform entities such as Amazon. It will be appreciated that multi-vendor platforms (sometimes referenced as "mega-platforms"), including but not limited to Amazon, rank their own products first while charging others for their ranking. Also, the multi-vendor platforms use vendor data to produce proprietary products/services when a profitable niche is identified, thus potentially exerting advantage over vendors participating on the platform and depriving consumers and vendors with a level playing field or marketplace. Consumers and businesses often do not receive a price they could if there were no intervening (middleman) party. The ease, convenience, and trust of purchasing online today is burdened by these and other problems. Finally, there is a disconnect between advertisements and purchasing; and people do not get 'credit' for suggesting things. Note, the suggestion can be created by simply wearing or owning an item. And, currently these persons or entities ("micro-advertisers") don't have a mechanism to receive credit or compensation for the role in influencing or initiating purchases. Also there is no honest, frictionless, alternative to mega-platforms and mega-retailers, that offers a viable alternative.

SUMMARY

The following summary is included in order to provide a basic understanding of some aspects and features of the claimed subject matter. This summary is not an extensive overview and as such it is not intended to particularly identify key or critical elements of the claimed subject matter or to delineate the scope of the claimed subject matter. The sole purpose of this summary is to present some concepts of the claimed subject matter in a simplified form as a prelude to the more detailed description that is presented below.

This disclosure incorporates artificial intelligence, natural language processing (hereinafter "NLP"), vision and robotics and specifically machine learning and deep learning. The field of artificial intelligence is essentially when machines can do tasks that typically require human intelligence. One embodiment encompasses machine learning, where machines can learn by experience and acquire skills without human involvement. Deep learning is a subset of machine learning where artificial neural networks, algorithms inspired by the human brain, learn from large amounts of data. Similar to how individuals learn from experience, the deep learning algorithm may perform a task repeatedly, each time tweaking it a little to improve the outcome. The disclosure refers to 'deep learning' because the neural networks have various (deep) layers that enable learning. Just about any problem that requires "thought" to solve is a problem that artificial intelligence can be used to solve.

In one embodiment, a non-transitory machine readable medium is described, with instructions stored thereon to cause one or more processors to receive a (i) product request; (ii) identify a product based on the product request; (iii) obtain, based on the identified product and a user profile associated with a user account or a vendor profile, product information from a plurality of vendors, wherein the user profile includes a modelling an object using an avatar or dimensionally accurate image for contextual view of an object; (iv) determine, based on the product information and the modelled object, recommended product specifics; present the recommended product specifics to the user; (v) receive, in response to the presented recommended product specifics, and typically prior to purchase decision, a confirmation regarding a particular product and a particular vendor from the application; (vi) initiate, in response to the confirmation, purchase of the particular product from the particular vendor; and (vii) present, after completion of the purchase, purchase confirmation information. Product specifics may include product sizes, color options, product specifications, ingredients, availability, etc.

In another embodiment, the disclosure provides for an image or object viewed by a user to become the subject of a user initiated search and resulting display directed to a purchase page displayed on an electronic device of the disclosure using the NOWW purchase application. It will be appreciated that this may be an agnostic purchase page, i.e., not limited to a single vendor and not comprising a vendor's own page. An agnostic purchase page can be a vendor's page within the NOWW purchase application page.

The user generated product request may include a photo taken; a textual representation of the product; a graphical image of the product from a television ad, print ad, digital or display ad, or show, movie, recorded or streamed content; a readable code, RFID or similar marker embedded in the product, standardized or graphical code representative of the product; an auditory command; a link or "post" from a social media site or sponsored posting; and the like. The instructions to identify the product may include executing image recognition operations and/or computer vision operations on the product request. Identification of the product may be done remotely by a server computer system communicating over a communications network. The communication network may utilize cloud storage or other features. The identified object can be displayed on a device, including but not limited to, a user's desktop monitor, tablet e.g., iPad, smart phone or watch. In some embodiments, it may be any wearable device. It may also be a device utilizing virtual or augmented reality or a combination of both vertual and augmented reality. The identification may include the product meeting the product request or, if the product is not identifiable or identifiable via the request, then similar items may be suggested.

The product information may be obtained from vendors chosen from a white-list of vendors or excluded by a black-list of vendors, or from a database of product information, which may be stored locally or queried over a communications network. The white-list and black-list of vendors may be stored in the user profile. The instructions to obtain product information (meeting a product request) maybe based on one or more of purchasing preferences, purchasing history, vendor discount information, vendor reward information, and payment methods and user's listing of acceptable vendors, which are included in the user profile. Note the user profile may be created upon signup to the NOWW app. This may include shared profiling such as sign up via Facebook or Google. The recommended product specifics may be determined by obtaining size, color, or other information from user preferences (user profile) or the modelled object (using an avatar or contextual projection) and extracting the recommended product specifics from the product information based on the vendor product (size, etc.) information and user profile. The user's inventory of items can be uploaded into the profile to facilitate creation of a database that a machine learning technology can use to recognize patterns, images or preferences and evaluate and provide suggestions or suitability filters to the user.

Extraction of the recommended product specifics may be limited based on the vendor white-list, black-list, or some combination of the two. The recommended product specifics (e.g. dress size) may be presented by display on an electronic device viewed by the user, e.g., desktop computer, laptop, tablet, smart phone, watch, etc. The instructions to initiate purchase of the particular product from the particular vendor may ensure a third party initiates the purchase for the benefit of the user and using the user's profile. This may be a gift purchase. The modelled object may include one or more models of an individual, e.g. user, an environment or an object. The modelled object may be used in conjunction with an avatar of a third persons, e.g., family member. The modelled object may be a two or three-dimensional or four-dimensional (three dimensional with movement) or sensory model of at least part of an individual, a three-dimensional or four-dimensional or sensory model of a room, or a "virtual environment" such as a refrigerator, closet, room and the like. The product can be modelled in a virtual depiction of the intended space, i.e., a couch dimensioned from a catalog into a dimensioned room of the prospective purchaser's home. The size of the object of interest can be sized in context with the intended space. The image can reside in the NOWW servers or cloud servers. The images may also reside in the servers of vendors having approved incorporation into the NOWW app.

In addition to creating a user profile for the NOWW app, the user can create a wallet containing payment information to the allow the NOWW app to automatically process purchases and payment to vendors.

If, in identifying the product, it is determined the product is not available, one or more similar products may be identified based on the initial product request, the user profile, computer vision or image recognition, or product information for each of the similar products included in the product information.

It will be appreciated that the disclosure may permit the NOWW app to collect data pertaining to each user, user profile and purchasing history. This data collection may, in an embodiment, shield user data from third party collection. In an embodiment, the user can elect to permit the NOWW app to share data with user designated entities.

The instructions to present purchase confirmation information may also update a reward field of the user profile in response to the confirmation.

The non-transitory machine readable medium may also include instructions to create, i.e., custom order the particular product from the particular vendor or from a database of product creation instructions, including instructions for three-dimensional printing. The instructions stored on the non-transitory machine readable medium may also be implemented as part of a system, or as a method.

The NOWW app, in an embodiment, may receive a percentage or fee from the transaction or purchase price.

In an embodiment, the NOWW app may act like as a purchase clearing house where the user may preview an intended purchase and facilitate "accurate shopping". In another embodiment, the NOWW app facilitates confirmation of a product authenticity prior to purchase. The ability to confirm authenticity will encourage purchases by users via the Internet and protect vendors from pirates of the vendor's products or services.

BRIEF DESCRIPTION OF THE DRAWINGS

FIG. 14 illustrates a suggested embodiment of contents or categories of a user profile. It should be emphasized that the listing illustrated in FIG. 14 is only an example and many other categories of objects may comprise a user profile.

DETAILED DESCRIPTION OF DISCLOSURE

Figure 1:
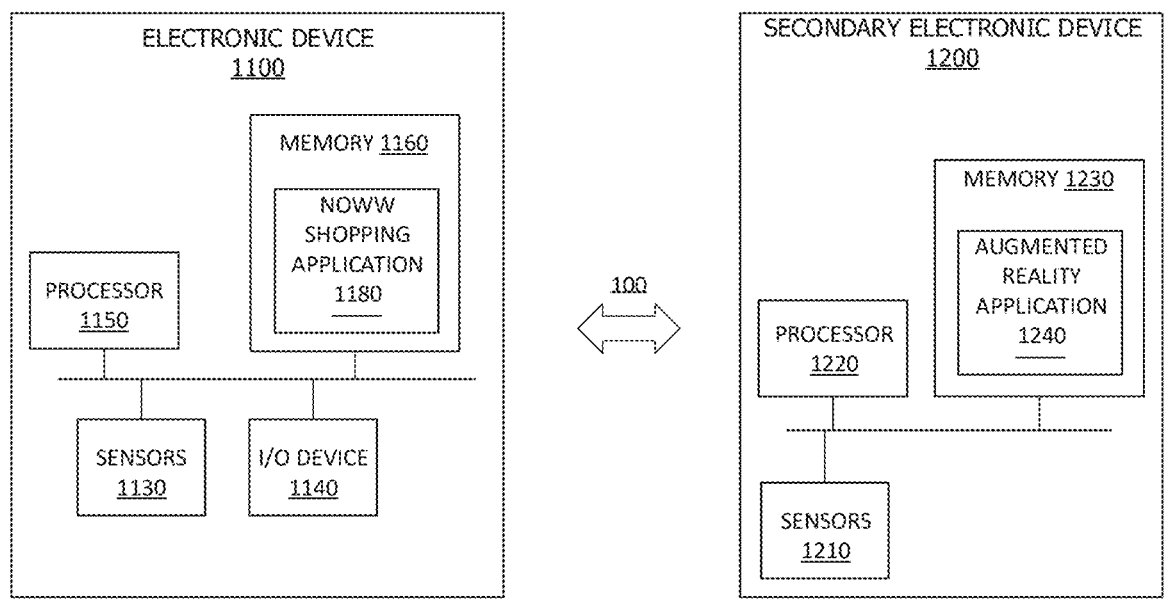
FIG. 1 shows, in block diagram form, a simplified electronic device and a secondary electronic device according to one or more embodiments.

This disclosure is directed to systems, methods, and machine readable media for facilitating online purchasing. In general, techniques are disclosed to facilitate online and mobile purchasing from user initiated ("in the wild") online shopping sites as well as from physical stores, or via virtual purchasing. According to one or more embodiments, facilitating online purchasing may allow a person to purchase correctly sized or better-suited products, more conveniently, more cheaply, and more easily directly from vendors or individuals.

One of the many important features of this disclosure is the utilization of machine learning and deep learning, to create a mechanism or algorithm that can instantly suggest product selections, including but not limited to dimensions, colors, material properties, e.g., strength or puncture resistance, or other attributes, thereby expediting the purchasing experience. This facilitates the utilization of "agnositic" shopping and purchasing platforms where the user is not reliant upon vendor created webpages, ads, device applications, etc., to guide or influence purchasing decisions. Example of machine learning are found in the utilities of smart devices such as those commonly named "Alexa®", "Siri®" or "Cortana®". Machine learning is utilized in enhancing machine translations wherein past corrections are retained in memory and incorporated in new situations. Another example are chatbots and service bots. Another example of machine learning is found in algorithms (incorporated into software) to achieve facial recognition. The machine learning utilized in the recognition of either objects or individual faces may incorporate neural networks. Further examples of this machine learning is "tagging" persons or objects in social media displays; vision, and NLP. (Alexa is a registered trademark of Amazon Technologies, Inc. Siri is a registered trademark of Apple Corporation. Cortana is a registered trademark of Microsoft Corporation.)

It will be appreciated that the user's inventory of items can be uploaded into the profile to facilitate creation of a database that a machine learning technology can use to recognize images and evaluate and provide suggestions to the user. In addition, images of objects or items can be uploaded and optionally categorized to facilitate the NOWW app recognizing scanned images.

One aspect of this disclosure is the utilization of individualized page displays that contain both user input and input from a machine learning entity. Such displays may be individualized to the user and independent of vendor marketing and choice selections (such vendor marketing understandably directed to encourage purchase of the particular vendor's products or services).

The display may contain icons, holograms, codes, radio buttons, etc., that can be initiated by a mouse click or tap by the user for a touch screen display. The icons can initiate a product page or product information page or comparison between a product request and the user profile. This comparison can utilize information that has been conveyed by a barcode, QR code, RFID tag or similar, obtained by receiving an image or scanning an object or via virtual reality or augmented reality. It will be appreciated that the user will remain on the NOWW app page screen display for the display and correlation between the user profile and product request. Note further that the NOWW app may also use data obtained from an upload of data, e.g., images of products, by the user. The user achieves a broaden data base to facilitate the utilization of machine learning by the NOWW app.

As used herein, image analysis refers to the extraction of meaningful information from digital images by means of digital image processing techniques. Image analysis tasks can be as simple as reading bar coded tags or as sophisticated as identifying an article of clothing worn by an individual in the image (e.g., shoes, pants, shirt, jacket, scarf or hat), or identifying a person from their face. There are many different techniques used to analyze images. Examples of image analysis techniques include, but are not limited to: two-dimensional (2D) and three-dimensional (3D) object recognition; image segmentation; motion detection; video tracking; optical flow, and 3D pose estimation. One of ordinary skill in the art would understand that machine learning techniques may be incorporated into image processing work flows. For example, output from a machine learning element may be used to drive image segmentation and/or object recognition. Similarly, image processing output may be used to drive or update a machine learning element.

It will be appreciated that an expanded upload of data, e.g., user profile inventory or selected object images, facilitates the effective utilization of machine learning by the NOWW app for the benefit of the user. This facilitates more accurate purchasing and thereby reduces the number of required returns to the vendor and repeat shipments. This lowers consumption of resources and detrimental environmental impact.

One example of machine learning can be employment of weighted averages to create a relevancy score for innumerable items and item attributes. Other examples of machine learning utilize linear regression, logistics regression, linear discriminant analysis, classification and regression trees, Naïve Bayes, K-Nearest neighbor (KNN), learning vector quantization, support vector machines, Bagging (Bootstrap Aggregation) and Random Forest, and Boosting and Ada Boost.

A further example of intelligent learning is disclosed in U.S. Pat. No. 8,670,979 issued to Thomas Gruber, et al. on Mar. 11, 2014 and entitled "Active Input Elicidation By Intelligent Automated Assistant" which is incorporated by reference herein in its entirety.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed embodiment In this context, it should be understood that references to numbered drawing elements without associated identifiers (e.g., 100) refer to all instances of the drawing element with identifiers (e.g., 100*a* and 100*b*). Further, as part of this description, some of this disclosure's drawings may be provided in the form of flow diagrams. The boxes in any particular flow diagram may be presented in a particular order. However, it should be understood that the particular flow of any flow diagram is used only to exemplify one embodiment. In other embodiments, any of the various components depicted in the flow diagram may be deleted, or the components may be performed in a different order, or even concurrently. In addition, other embodiments may include additional steps not depicted as part of the flow diagram.

The language used in this disclosure has been principally selected for readability and instructional purposes, and may not have been selected to delineate or circumscribe the disclosed subject matter. Reference in this disclosure to "one embodiment" or to "an embodiment" means that a particular feature, structure, or characteristic described in connection with the embodiment is included in at least one embodiment, and multiple references to "one embodiment" or to "an embodiment" should not be understood as necessarily all referring to the same embodiment or to different embodiments.

It should be appreciated that in the development of any actual implementation (as in any development project), numerous decisions must be made to achieve the developers' specific goals (e.g., compliance with system and business-related constraints), and that these goals will vary from one implementation to another. It will also be appreciated that such development efforts might be complex and time consuming, but would nevertheless be a routine undertaking for those of ordinary skill in the art of image capture having the benefit of this disclosure.

For purposes of this disclosure, the term "microphone" refers to a transducer that converts sound into an electrical signal. In one or more embodiments, the microphone may refer to any kind of microphone, such as a dynamic microphone, a condenser microphone, or a piezoelectric microphone. Further in one or more embodiments, the microphone may be an internal component of an electronic device or a separate external component connected to an electronic device.

Also for purposes of this disclosure, the term "camera" refers to a lens assembly along with the sensor element and other circuitry utilized to capture an image. In one or more embodiments, the lens assembly may include multiple lenses. Further in one or more embodiments, the lens may be moved to various positions to capture images at multiple depths and, as a result, multiple points of focus. In one or more embodiments, the lens may refer to any kind of lens, such as a telescopic lens or a wide angle lens. As such, the lens assembly can mean a single optical element or multiple elements configured into a stack or other arrangement.

For purposes of this disclosure, artificial intelligence, e.g., machine learning can pertain to acquiring, processing and categorizing data without human involvement and may utilize deep learning, neural networks, NLP, vision or the like. An Example of machine learning is described in FIG. 14 discussed in greater detail below.

For purpose of this disclosure, "bot" pertains to and includes, but is not limited to, chatbots and service bots.

As used herein, an image of a "real-world environment" is an image of any environment a user finds themselves in. By way of example only, an image of a real-world environment may be an image of a real person wearing specific clothing, an image of a mannequin adorned with specific clothing, or an image of a particular automobile.

Micro-advertiser pertains to a person wearing or using products such as clothing, food items or any other products or objects that are seen by others. The micro-entity may be identified by a bar code or similar marker appearing in images of the person or object.

Four dimensional presentation pertains to an avatar or other display presentation in motion, including rotation, controlled by a user viewing the presentation on a display.

Agnostic is used herein to pertain to evaluation or identification of multiple vendors, products or services without preference. It can also mean that the user's actions in making purchase decisions are not performed at a vendor site or that users' options are not limited to the products of a single vendor or website selection. In this way, NOWW can act as an agnostic shopping cart for quick one or two step purchasing and let the NOWW shopping application 1180 divide the shopping cart into brands or orders. The NOWW app is referenced as "agnostic" in that no vendor or product source is favored. A vendor agnostic shopping cart (wherein there is no vendor preference) may be used for the quick and easy purchase of products from multiple vendors and instant execution of the purchase from within the product page of the NOWW shopping application 1180.

Product queries, as used herein, may be requests for information from vendor or other websites based on a product request.

Product request may be a request for products or services. It may also include a group of items of interest. This interest may occur based upon images, user initiated online searches (i.e., in the wild) or appearances from any source including observed individuals or objects, print ads, digital ads, Internet searches, appearance seen by a user, films, television, anything identifiable, etc.

Product specifics may result from product queries generated in response to a product request, such as product dimensions, size, color, shipping options and the like. The creation of product specifics may also utilize a user's profile. Product specifics may be used to model the product including modelling with an avatar or contextual imaging.

Referring to FIG. 1, a simplified block diagram of an electronic device 1100 is depicted, in accordance with one or more embodiments of the disclosure. Electronic device 1100 may be part of a multifunctional device, such as a mobile phone, tablet computer, personal digital assistant, portable music/video player, watch or other wearable device, or any other similar electronic device. In one or more embodiments, FIG. 1 depicts an electronic device 1100 that is a computer system. Electronic device 1100 may be connected to other devices across a network, such as secondary electronic device 1200, mobile devices, tablet devices, desktop devices, as well as network storage devices, computing servers, or other devices. Electronic device 1100 may also be connected to secondary electronic device 1200 via a wireless, or a wired connection 100. FIG. 1 shows connection 100 between electronic device 1100 and secondary electronic device 1200, which may be a network connection, a wired connection, or a Bluetooth connection, among others.

Also illustrated in FIG. 1 is a second device 1200. This illustrates an event in which a first person, e.g., user, possesses a phone or tablet and a second person, e.g., friend or design consultant. The first person can scan a product image, etc. to the second person for input or approval.

Electronic device 1100 may include a processor 1150. Processor 1150 may be a system-on-chip such as those found in mobile devices and include one or more central processing units (CPUs), dedicated graphics processing units (GPUs), or both. Further, processor 1150 may include multiple processors of the same or different type, and each such processor may utilize or incorporate multiple cores. Electronic device 1100 may also include a memory 1160. Memory 1160 may include one or more different types of memory which may be used for performing device functions in conjunction with processor 1150. For example, memory 1160 may include cache, read only memory (ROM), and/or random access memory (RAM). Memory 1160 may store various programming modules during execution, including shopping application 1180. For ease of description, the name "NOWW" is used herein in reference to shopping application 1180. It should be understood, however, that this name is merely an example and any name may be used in its place.

In one or more embodiments, memory 1160 may also include augmented reality application 1240. Augmented reality application 1240 may also include virtual reality capabilities.

Electronic device 1100 may also include sensors 1130. Sensors 1130 may include a camera comprising an image sensor, a lens stack, and other components that may be used to capture images. For example, the camera included in sensors 1130 may be configured to capture images of an environment from the point of view of a user. In addition, sensors 1130 may include multiple cameras, configured to capture images from different points of view. One or more cameras included in sensors 1130 may be configured to perform a scan such that processor 1150 is able to create a modelled object and model products on the modelled object when facilitating online purchasing. Other types of sensors such as, for example, proximity, ambient light, accelerometer and gyroscope sensors may also be included in sensors 1130.

In one or more embodiments, the electronic device 1100 may also include input/output (I/O) device 1140. I/O device 1140 may be any kind of input or output device, such as microphones for voice control input, speakers for audio data output, cameras for visual input, displays for visual data output, touch screens for tactile input, or any combination thereof. The I/O may also include a camera, a barcode scanner (e.g., 1D or 2D) and RFID reader.

The device may include an image capturing device containing a lens and other components that may receive electromagnetic radiation including but not limited to ultra-violet, visible light and infra-red radiation. The radiation is received through the lens onto electrical sensors. The electrical sensors may detect an image from the received radiation. The electrical sensors may convert the detected image into an electrical signal. The device may include emitters that transmit electromagnetic radiation (EMR) in a wide range of visible and invisible wavelengths. The device may include sound emitters. The device may contain distance, motion, position, pressure, and humidity sensors. The device may also contain image processing units (IPU), vision processing units (VPU), neural networks, databases, microprocessors, central processing units (CPU), software, firmware, power and/or data connectors, and power sources.

In still another embodiment, the image may be analyzed in accordance with any one or more of a number of known image analysis techniques. In yet other embodiments additional input may be used to refine or drive the image analysis. For example, a digital advertisement for product "X" may be used to drive the image analysis to search for product "X". In another example, audio input may be obtained and analyzed using natural language processing (NLP) techniques to identify a product in an image. One example of this may be obtaining audio input representative of "I would like those shoes." Through application of NLP techniques this audio input may be used to drive the image analysis to "search" the image for shoes. Once one or more shoes are identified, further analysis of those objects may be used to uniquely identify the desired shoes (e.g., shoes from manufacturer "Y"). This information could then, for example, be combined with a user profile's information (e.g., the user's shoe size) to obtain information from one or more vendors about the availability and cost of shoes from manufacturer "Y" in the proper size.

The device may further include one or more lights positioned to illuminate an object. The display may simultaneously display the object being scanned. The light may be infra-red or ultra-violet. This light may display information contained on the surface of an object that is not otherwise visible.

The device may also include an RFID reader that may activate a passive RFID tag. The tag may transmit data regarding the object for the benefit of the user.

The data received from an RFID tag, barcode, QR code or similar can be displayed to the user on the display screen of the device. The device may include icons to allow the user to initiate a search of the user profile for items similar to the scanned object. The device may also allow the user to launch a product page information page or initiate an inquiry to the vendor (identified from the scanned code or from object information in the user profile) regarding further information pertaining to the object, e.g., size or dimension information, color, fabric, material properties, ingredients, object subject matter, availability, etc. The NOWW app may initiate the inquiry utilizing information input by the user or suggested information/criteria from the NOWW app utilizing the profile/database.

In one embodiment, the NOWW app opens the vendor webpage and populates product size, color, etc., information into the vendor page. This function can be performed internally in the NOWW app without changing the screen display visible to the user. Responsive information can also be displayed to the user on the NOWW app page display screen. See for example U.S. Pat. No. 6,629,135 issued to D. Delano Ross, Jr., et al, entitled "Affiliate Commerce System and Method" dated Sep. 30, 2003 and which is incorporated herein by reference in its entirely.

The NOWW app display screen can also be shared with third parties as instructed by the user or may be part of executing a purchase. It will be appreciated that the utilization and maintaining the NOWW app screen display enhances frictionless shopping. It also effectively allows the user to compare information from multiple vendors without being diverted to an individual vendor website and then maneuvering among the websites of multiple vendors. This feature thereby enhances more accurate selection choices and reduces incorrect shipments and necessary returns.

The user, in response to the vendor supplied information, may also initiate an inquiry into further specifics of the object or item. The vendor's response containing product specifics can be shared with third parties. This sharing may be subject to permission from the third party. Examples of third parties as used in this disclosure include friends, family members, employers or employees, coaches, designers, etc. It will be appreciated that in each case, the third parties can respond to the user.

The user can also initiate a purchase of the specified object at any stage and the purchase achieved though the user wallet (that may also have been established simultaneously with the creation of the user profile). Again, it will be appreciated that the NOWW app display is visible to the user. The NOWW app will transmit or populate the required information for the NOWW app user wallet to a vendor's check out page or similar. This may be a single action of seamlessly for guided purchasing.

Note it will be appreciated that the NOWW app may also present or display information regarding the object obtained from a plurality of vendors. This display may occur within a single display or purchase page.

The device may also include any other protocol or method to identify products or services. For example, I/O device 1140 may be any kind of display device, such as a liquid crystal display (LCD), light emitting diode (LED) display, organic LED (OLED) display, optical display, or the like. Further, the display device may be a traditional display or a semi-opaque display, such as a heads up display or the like. The display may also be part of a head-mounted display, according to one or more embodiments. In some embodiments, electronic device 1100 includes a storage component in order to secure the user's private data on a local device. In this way, the user's privacy may be protected.

Although electronic device 1100 is depicted as comprising the numerous components described above, in one or more embodiments, the various components may be distributed across multiple devices as part of a distributed system. Further, additional components may be used and some of the functionality of any of the components may be combined.

Product Request

In one or more embodiments, shopping application 1180 is configured to facilitate online shopping. For example, NOWW shopping application 1180 may be used to make an online purchase at a user's instruction in any number of ways. For example, in one or more embodiments NOWW shopping application 1180 may receive a product request. The product request may be for any product or service. In some embodiments, the product request may be digital user input corresponding to social media, social media ads, other software applications, websites, and the like. In other embodiments, the product request may be sent from a camera included in sensors 1130. The product request, in one embodiment may be initiated by the user scanning an object or item of clothing utilizing the NOWW app scanner. The NOWW app, utilizing memory and user profile, may recognize the object and a request can automatically be made from the device, perhaps by clicking or touching an icon on the device display screen, to the vendor wherein additional product information can be provided.

For example, the camera may take a picture of a QR code®, a bar code, an electronic article surveillance (EAS) code, an RFID or smart-RFID code, a proprietary code, an embedded code, virtual or augmented reality or other a unique icon/marker associated with a product of interest to a user.

In one embodiment, the product may be included in a database stored or accessed from the NOWW shopping application 1180; and the like from paper or digital print publications or TV, film, and other media. (QR CODE is a registered trademark of Denso Wave Incorporated.) It will be appreciated that an I/O component of the device can include an RFID reader and barcode or QR Code reader or any other protocol and that detected signals can be imputed into the device or app CPU for analysis or transmission. It will be further appreciated that the QR code (two dimensional barcode), UPC (one dimensional bar code), EAS codes or RFID device may be embedded in the object or product. The code or identifier may also be virtual, e.g., not visible without a code reader or other device.

It will be appreciated that this database may contain an inventory of user owned items, including color, size, subject matter, etc. This database may be created at the time the user's profile is created. The user may also upload additional items into the database. These can be items of the user's wish list or otherwise. The additions to the database may be images to facilitate object recognition of scanned items.

In another example, the camera may take a picture of a product in any advertisement from paper or digital print publications or television. In one embodiment, a NOWW shopping icon may be integrated into any camera's user interface, allowing a user to transition directly from the camera to the NOWW shopping application identification or purchase 1180 featuring the product or code request from the camera. In another embodiment, the camera's user interface may include a NOWW shopping application icon that when selected opens a dialog to recognize and facilitate the purchase of retail products or services in the camera's view. In another embodiment, it may immediately launch a product information page from a photo or upon image recognition. In another example, the camera user interface may include an augmented reality graphical user interface (GUI) that flags recognized products as the user moves the camera.

Each flag presented by the augmented reality GUI would include a NOWW shopping application icon that, when selected, may open the product's purchasing page in the NOWW shopping application 1180. It will be appreciated that in some embodiments, there may be a pre-agreed arrangement between the NOWW app and a vendor.

In another example, the camera included in sensors 1130 may take an image of a product in use, such as a person's clothing, a mug at a coffee shop, and the like, before performing image recognition to identify the product from the picture; or the same can happen from image recognition without a photo actually being taken. The recognition may be via a watermark (containing legible information), a 2 dimensional medium or a code on or in a 3D medium.

In one or more embodiments, the NOWW shopping application 1180 may model the product image in the context of a model of a user (i.e., avatar), object, or environment saved to the user's profile. For example, show a garment on a model of the user, a bar stool in a model of the user's kitchen, and the like. It will be appreciated that this "contextual" display may include the dimensions of the user's home with the object correspondingly dimensioned. In this manner, the user can see an image of the object(s) as they may be positioned in the user's home, etc.

At this point, the user may take one of several actions, such as: (i) store the product image to a saved scan list; (ii) generate a GUI representation of saved items in context labelled as a virtual world; (iii) interact with social media, send text messages, emails, message or otherwise communicate regarding one or more products; (iv) immediately purchase the item in the NOWW shopping application (v) invite another user into a virtual world or shared showroom to view something 1180; and the like.

In one or more other embodiments, the NOWW shopping application 1180 may populate a database with all images, codes, and the like submitted to it for use in future product requests. This receipt of data may provide enhanced machine learning and supplementation of the user's profile (independent of the occurrence of a purchase).

In other embodiments, the product image may be stored to a saved scan list which the user may use to search for the product using the NOWW shopping application 1180 or share with another person's NOWW shopping application 1180 at their convenience. For example, a user may check their user profile to search for a saved product or to check if they have enough of a particular ingredient for a recipe. It will be appreciated that the user profile can include the date the item appearing in the profile was purchased, as well as the other attributes of the item such as size, etc. Further, the scan list may be separated or integrated into the user profile. In one or more embodiments, the saved scan list may sort the saved product images based on chronology, category, search term, product source, grouping, and the like or into the appropriate part of the NOWW shopping application profile or virtual world. For example, the saved scan list may be sorted based on who the product is for and based, further, on what the product is and the information saved in the user's user profile. In still another example, the saved scan list may be sorted by product category such as groceries, clothing, furniture, and the like. In a further example, the saved scan list may be sorted based on the product's source such that all products from a certain vendor are grouped together. In an embodiment, the grouping can be accessed by voice command. In still another example, the saved scan list may be sorted by grouping outfits (clothing) or recipe ingredients together. In yet another embodiment, NOWW shopping application 1180 may receive a product request from a link shared to a social media post. For example, a social media post may be associated with a NOWW shopping icon with an embedded widget which will launch the NOWW shopping application 1180 with the particular product already featured when selected. In this example, the NOWW shopping icon with an embedded widget or code contains the product request as metadata. As discussed previously, the user may save the product request to a saved scan list for later review.

In another embodiment, the user may send the product request to one or more friends through social media including but not limited to media such as Facebook Messenger®, Instagram, "tweets" on Twitter®, "pins" on Pinterest®, "snaps" on Snapchat®, text messages, email, messaging, and the like and asking for the friends' opinions and advice or to advertise the product to the friends. (FACEBOOK MESSENGER is a registered trademark of Facebook, Incorporated. TWITTER is a registered trademark of Twitter, Incorporated. PINTEREST is a registered trademark of Pinterest, Incorporated. SNAPCHAT is a registered trademark of Snap, Incorporated.) Alternatively, the user may invite one or more friends into the user's virtual world to see the product request, purchase the product from the virtual world or to request an opinion/approval.

In more embodiments, NOWW shopping application 1180 may receive a product request as a text message input from a keyboard such as text, email, or messaging application; touch input from a touch-screen; or as voice input from a microphone. For example, the microphone may detect voice input and send the voice input to the processor, which will perform voice recognition and parse the voice input for the product request. Further, the product request can be generated by clicking or touching a scanned or saved image such as an image of a person wearing a desired garment.

In another embodiment, the processor may receive the product request from a chat bot "finder" associated with NOWW shopping application 1180, chat on a website, agnostic Now chatbot, or the like. For example, the chat bot finder may receive a user's request, bar code, QR code, EAS code, search input or the like and perform a basic search based on the user's input and stored preferences. For example, the chat bot finder may only search for women's clothing or a particular brand. It will be appreciated that the brand may be ascertained from the image acquired by the user. The user may purchase the item based upon information contained within the image or derived by the user's device from the image. Alternatively, the chat bot finder may then ask specific questions of the user to help refine the search and produce results based on the user's answers. The user may then pick the item desired and the chat bot finder may produce more results based on the new input. The chat bot finder may also find similar items if the item of interest is not available. In another example, the chat bot finder may receive a request for a generic product or an image of a generic product such as black pants. As this discussion evidences, NOWW shopping application 1180 may generate one or more product queries based at least in part on the product request. For example, if the product request is an image of a product in use, the processor 1150 may perform image recognition to determine the desired product within the image. The user may exercise the purchase option based upon the image, product query or product specifics.

In some embodiments, the product request may include a group of items of interest, such that processor 1150 must perform image recognition to determine one or more desired products within the image. For example, the product request may be an image of a person wearing a suit where the desired products include the suit, shirt, tie, belt, and shoes included in the image. The image recognition may be done remotely over a network connection. In another example, if the product request is an image of a bar code, QR code, EAS code, microcomputer, or the like, NOWW shopping application 1180 may compare the image of the code to a database of stored codes to decode or otherwise interpret the desired product from the code. If the product request contains a list of multiple desired products, NOWW shopping application 1180 may divide the list into several individual product queries. In a further example, if the product request is a plain language text input from a keyboard or from a parsed voice command, a machine learning, deep learning, neural networks, algorithms, NLP, vision or artificial intelligence may be used to interpret and parse the plain language text input into one or more product queries.

In at least one embodiment, NOWW shopping application 1180 simultaneously sends the one or more product queries to a plurality of vendors. In some embodiments, the plurality of vendors may include single brand vendors, like Adidas®, or marketplace vendors, like Ebay®. (ADIDAS is a registered trademark of Adidas AG Joint Stock Company. EBAY is a registered trademark of eBay Inc.) In one embodiment, the plurality of vendors may be selected from a list of vendors the user has previously purchased from stored as part of the user profile.

In other embodiments, NOWW shopping application 1180 may send the one or more product queries to a general search engine, such as the Google® search engine and select the plurality of vendors from the general search results. (GOOGLE is a registered trademark of Google LLC.) Alternatively, NOWW shopping application 1180 may use the one or more product queries to search a local database of product information supplied by one or more vendors or multi-vendor entities such as Macy's, Dillard's, etc. In turn, NOWW shopping application 1180 may receive product information from the plurality of vendors or retrieve the product information from a local database associated with NOWW shopping application 1180 as needed.

NOWW shopping application 1180 may also be used to aid authentication of products. In generating product queries and receiving information from the plurality of vendors, NOWW shopping application 1180 may use product images obtained online, e.g., vendor web sites or open an API, to compare images of the product taken by the user to images of the product from the genuine manufacturer to determine a probability of authenticity. This image comparison may be done remotely over a network connection. Vendors may also submit data to aid in authentication, such as a proprietary code, maker's mark or label, embedded codes, RFID tag, microcomputer, hologram and the like.

In another embodiment, product authentication may be done through a blockchain registry of luxury goods or any goods. By extension, blockchain could serve as a secure ledger for the purchase of authentic luxury or other goods and to track products' origins. The blockchain ledger may allow the user to trace the transit or custody steps of the product or service back to the vendor, manufacturer, or ingredients origin. Where NOWW shopping application 1180 is able to verify a product or manufacturing methodology as authentic, NOWW shopping application 1180 may use an authenticity watermark visible to the user to denote the image shows an authentic product.

In some embodiments, because NOWW shopping application 1180 places orders directly with vendors selling known authentic brands the NOWW shopping application 1180 can lessen a users' fear of purchasing non-authentic goods, i.e. "knockoffs".

Where an authentic product is too expensive for the user, NOWW shopping application 1180 may show similar products in other price ranges. For example, if the user makes a product request for a Louboutin® pump but decides an authentic product is too expensive, upon user request, the NOWW shopping application 1180 may show other pumps in similar colors, heel height, and the like in a less expensive price range. (LOUBOUTIN is a registered trademark of Christian Louboutin.) Where an authentic product is no longer available and NOWW shopping application 1180 is unable to find the exact product, such as an antique or a product no longer manufactured, NOWW shopping application 1180 may recommend similar products to the user. These similar products may be identified by the NOWW shopping application utilizing an image search function in conjunction with the cloud or a network such as the Internet. NOWW shopping application 1180 may retrieve a user's profile. The user's profile may use user input or user profile, artificial intelligence, e.g., machine learning of NOWW shopping application, or proprietary shopping algorithm (PSA) to identify possible suitable substitute items.

In one or more embodiments, the user profile may contain the user's purchasing history, purchasing preferences such as brand, size, and color, preferred vendors, payment methods, discounts, shipping and billing addresses, saved scan list, friends list and the like. The user profile may further contain a virtual "world" including modelled objects of the user, other people for whom the user frequently purchases, the user's pets, the user's home (or parts thereof), the user's vehicles, other objects, other environments, preferences and visual representations of all saved categories and the like. These modelled objects may be used in virtual, mixed, or augmented reality contexts, as well as to aid machine learning, deep learning, neural networks, or artificial intelligence routines (part of NOWW shopping application 1180 or working in tandem with NOWW shopping application 1180). The modelled objects may be in correct product size, specification and other suitable determinations. In some embodiments, the user profile may include one or more stored modelled objects.

NOWW shopping application 1180 may work in conjunction with one or more cameras included in sensors 1130 to create a modelled object. The NOWW shopping application can also work in tandem with other vendors' modelling technologies. In some embodiments, the scan may be used to generate a three-dimensional or four-dimensional model. Alternatively, the user may input measurements or size information.

For example, the user may input and save dimensions of a room in the user's profile, and/or combine the dimensions with an image to create a contextual environment. The user profile may also contain features, including but not limited to, rewards, discounts, free products, proprietary or generic digital currency, and the like the user may have earned through peer-to-peer advertising and a unique user identifier allowing NOWW shopping application 1180 to track the user's "advertising" contributions, referrals or other suggestions. This may also include tracking the connections made with others via the NOWW shopping application.

In one or more embodiments, NOWW shopping application 1180 may determine product specifics based at least in part on the product information from a plurality of vendors or product databases and the user profile. For example, the user profile may contain the user's general preferences, preferred vendors, and preferences for certain colors and fabrics, as well as any food allergies, dietary restrictions and other preferences. The algorithms (which may include machine learning) utilized by the application can discern, flag, and accommodate such specialized user requirements or preferences. In another example, the user profile may contain one or more modelled objects of people, i.e., avatars. The processor 1150 may then choose an appropriate modelled object on which to model the product. For example, if the product is an article of clothing and the user's avatar is the only modelled object, the processor may choose the user's avatar to model the product (using NOWW technology or other technology such as Tru Fit) or ask for confirmation. The user may also select the appropriate modelled object and prompt the product modelling as well. The product specifics may include product dimensions, color options, shipping options, and the like.

In one embodiment, the processor 1150 may select a recommended product size or dimension of a particular brand compared with the appropriate modelled object and any purchasing history as well as any stored preferences to assess the appropriateness of a product for the user. By way of example, where the product request is a recipe and the determined product specifics are recognized as a food allergy conflict based on the user's profile, the NOWW shopping application cart may notify the user and include a recommended modification or substitution of the offending ingredient(s). NOWW shopping application 1180 may present or display to the user the determined product specifics and receive the user's confirmation (e.g., through a mouse-click or finger-tap on a touch-sensitive display). For example, the user may confirm or override the appropriate modelled object, the recommended product size, and other recommendations, such as color, shipping method, and the like.

In one or more embodiments, NOWW shopping application 1180 may also send or provide the user with product reviews, e.g., tiered reviews and verified offers or reviews such as potentially prioritizing reviews by the user's friends over the general public. In one or more embodiments, NOWW shopping application 1180 may also present a virtual try-on of the product. For example, NOWW shopping application 1180 may use the product specifics to model the product on the appropriate avatar (including but not limited to an avatar generated by or contained within the user profile) and show the product at different angles, a 360 degree view, or in motion (4D), as well as in three or four-dimensions and/or in tandem with other technology. As will be discussed shortly, modelling the product specifics may include an interactive game or scenario simulations.

In one or more embodiments, NOWW shopping application 1180 may also offer a virtual or augmented reality try-on of the product. For example, where the product is a coffee table, the processor 1150 may select a model of the user's living room (from their user profile) and overlay the image of the coffee table at an appropriate place in the room or see a related ensemble. The image may incorporate dimensional room data combined with dimensional data of the coffee table to create a combined image of the table in the room in context with the dimensions and scale.

Alternatively, the user may hold a camera included in sensors 1130 such that the room is in view and processor 1150 may overlay the image of the coffee table over the camera's view of the room. The user may also move the overlay into the desired location in the augmented reality display, change the size of the overlay, change product features, add other items, and otherwise customize the product as available. The user may add the product to a saved list or environment from the augmented reality display.

The virtual try-on may include a "see a look," or other suggestions or grouping, or upsell option wherein NOWW shopping application 1180 recommends related or coordinating products at any point during, after or independent from the purchasing process. The recommended products may be determined based on the determined product specifics, vender-determined coordinates, user preferences, prior purchases, previously used search terms, and the like stored in the user profile. For example, where the product request is for a particular coffee table, the virtual try-on may show the coffee table modelled in the modelled object of the user's living room and recommend a coordinating rug or vase. The origin of the item, materials, raw materials, and the like may be traced back to the vendor or manufacturer via verified blockchain and distributed ledger or other technology. In the case of services, the service provider may be traced through the provider's history, review, and other information, such as resume, experience, education, and other clients.

The user may send the virtual try-on, augmented reality try-on, or the product specifics to friends for advice and opinions, such as but not limited to through social media or text messaging, before purchasing the target product. This may utilize the secondary electronic device 1200 illustrated in FIG. 1. The virtual try-on may include an advertisement or game into which the appropriate modelled object is incorporated. For example, where the product request is for a business suit, NOWW shopping application 1180 may show the business suit modelled on a model of the user and show the user's model dressed in the business suit giving a TED Talk® on the TED® stage. (TED TALK and TED are registered trademarks of Ted Conferences, LLC.)

In another example, the advertisement may incorporate television (TV) shows to allow the user to compete against the show hosts or other users, such as a room re-decorating competition against house flipping TV show hosts. In another example, once the user completes a purchase, the user may compete with other recent purchasers to win a prize. In one or more additional embodiments, the user may send the virtual try-on to one or more friends from a friends list stored in the user profile for advice and opinions before making a purchase. The virtual try-on may be watermarked with a NOWW icon allowing the friends to purchase the products shown as well. The virtual try-on may be shared by text, email, social media messaging and posting, in-app messaging, airdrop®, and the like. (AIRDROP is a registered trademark of Apple Inc.) The virtual try-on may also be shared with people not included on the friends list by device-to-device sharing, via NOWW shopping application 1180, via a sharing icon within NOWW shopping application 1180 or other code such as QR codes, or via social media, and the like. Alternatively, the user may invite friends to access the modelled objects in the user's virtual "world" stored in the user profile. The invitation may be limited to a certain room's modelled object or modelled product or open to any modelled object at any time. The user may make the invitation temporary or rescind the invitation at any time.

Purchase

After NOWW shopping application 1180 receives confirmation that the determined product specifics or changes to the determined product specifics from the user via I/O device 1140 are acceptable to the user, NOWW shopping application 1180 may send the determined product specifics to a chosen vendor's transaction system as a pass-through, where NOWW shopping application 1180 is credited back a percentage of the order. Alternatively, NOWW shopping application 1180 may execute the order and send the determined product specifics to a vendor portal where vendors may retrieve the product specifics and create or retrieve an order. Vendors may then port or transmit the order to their fulfillment partner of choice. It will be appreciated that the user may place the order via the NOWW shopping application and the order immediately sent by NOWW shopping application to the vendor via through integration into the vendor portal or any other methods. In one embodiment, payment may be debited from the user's NOWW shopping application account. NOWW shopping application may distribute the payment to the vendor less deduction for NOWW shopping application services. In another embodiment, the vendor receives the payment and credits back a portion to NOWW shopping application.

In some embodiments, the user profile may include access to the user's global positioning system (GPS) or other location information, allowing NOWW shopping application 1180 to select a vendor closest to the user for quickest product delivery or recommend the nearest vendor with the determined product in stock. Where the determined product specifics include products from multiple vendors, the NOWW shopping application 1180 may divide the determined product specifics into its component vendors for each vendor to retrieve or send to a user. In this way, NOWW shopping application can act as an agnostic shopping cart for quick one or two step purchasing and let the NOWW shopping application 1180 divide the shopping cart into brands or orders. The NOWW shopping application is referenced as "agnostic" in that no vendor or product source is favored. Determined product specifics may be downloaded in real-time or in periodic pushes, or in response to a notification from the NOWW shopping application 1180 the one or more product specifics are awaiting retrieval by the vendor. The NOWW shopping application 1180 may facilitate integration with the vendor's fulfillment process or the vendor may initiate the integration into the vendor portal. The NOWW shopping application 1180 may or may not execute the entire brand "onboarding" process to facilitate integration as software, service, or other process available for hire or not for hire as determined by the parties. This may be executed or built upon blockchain. Order status and tracking updates may be available directly from the vendor, from the NOWW shopping application 1180, or both.

Once a user confirms their desire of a product by confirming the product specifics, NOWW shopping application 1180 coordinates with a NOWW shopping application wallet to negotiate payment with the chosen vendor's transaction system using payment methods available in the user profile. The user profile may contain one or more methods of payment, such as credit cards, debit cards, gift cards, bank account information, and online money transfer systems like PayPal®, Chase QuickPay®, Venmo®, and Apple Pay® or other similar method. (PAYPAL is a registered trademark PayPal, Inc. CHASE QUICKPAY is a registered trademark of JP Morgan Chase Bank. VENMO is a registered trademark PayPal, Inc. APPLE PAY is a registered trademark of Apple Inc.) It will be appreciated that in one embodiment, the NOWW shopping application purchasing app will supply the needed purchasing information, including credit/debit card information to the vendor's site without the user having to leave the NOWW shopping application purchasing app.

In another embodiment, the user may initiate a complete purchase transaction by clicking (or touching) on an image watermark or similar code or marker. The NOWW shopping application identifies and transmits a purchase instruction to the appropriate vendor. The NOWW shopping application also can make payment from the user's wallet established via the NOWW shopping application. In an embodiment, the NOWW shopping application stays in the background. Further, it will be appreciated that the user is not directed to a third party website, e.g., a vendor or any other outside or individual website.

In one or more embodiments, payment methods may include digital currency, such as Bitcoin, generic shop coin, branded or vendor specific coin, or any digital currency specific to mobile ecommerce shopping. Branded or vendor specific coin may be converted to generic shop coin, which in turn may be converted to cash; or in one embodiment accumulated rewards can be used to fully or partially purchase. NOWW shopping application 1180 may then receive confirmation information from the chosen vendor's transaction system and in turn present that confirmation information to the user through I/O device 1140.

FIG. 1 also shows secondary electronic device 1200 which may be one or more of a mobile device, a tablet, a smartwatch, wearables such as goggles, virtual devices, one or more remote computing or storage servers, or the like. It can also be a desktop computer, television or laptop. In one or more embodiments, secondary electronic device 1200 includes sensors 1210, processor 1220, and memory 1230. In general, components in secondary device 1200 having the same or similar name to those in electronic device 1100 may be of the same or similar type and serve the same function. For example, sensors 1210 may include a camera, RFID device or barcode reader or the like. The device may also include a display component, an interface device to communicate with the user's electronic device 1100.

In one or more embodiments, augmented reality application 1240 is configured to receive a product image from NOWW shopping application 1180 to superimpose over the view from a camera included in sensors 1210. For example, virtual, mixed or augmented reality application 1240 may receive an image of a piece of furniture, such as a couch, from NOWW shopping application 1180 and superimpose the image of the couch over the camera's view of a user's location (e.g. living room), giving the user an augmented reality view of the living room with the couch included. The user may then move the image of the couch around the camera's view into a desired position or customize the product where available through user input. This feature of the device allows a contextual representation of how the couch will appear in the user's living room.

Alternatively, augmented reality application 1240 may superimpose the product image over a static photograph stored in the user profile. As in the above example, the image of the couch may be superimposed over a static photograph of the user's living room stored in the user profile. The user may then move the image of the couch around the static photograph into a desired position, giving the user a virtual, mixed or augmented reality view of the living room with the couch included. The user may save the static photograph with the superimposed product image as a "room" in the user profile or share it with friends through social media and the like. The user may also create wish lists based on the saved "room" in the user profile. In yet other embodiments, augmented reality application 1240 may reside in memory 1160 of electronic device 1100.

Figure 2:
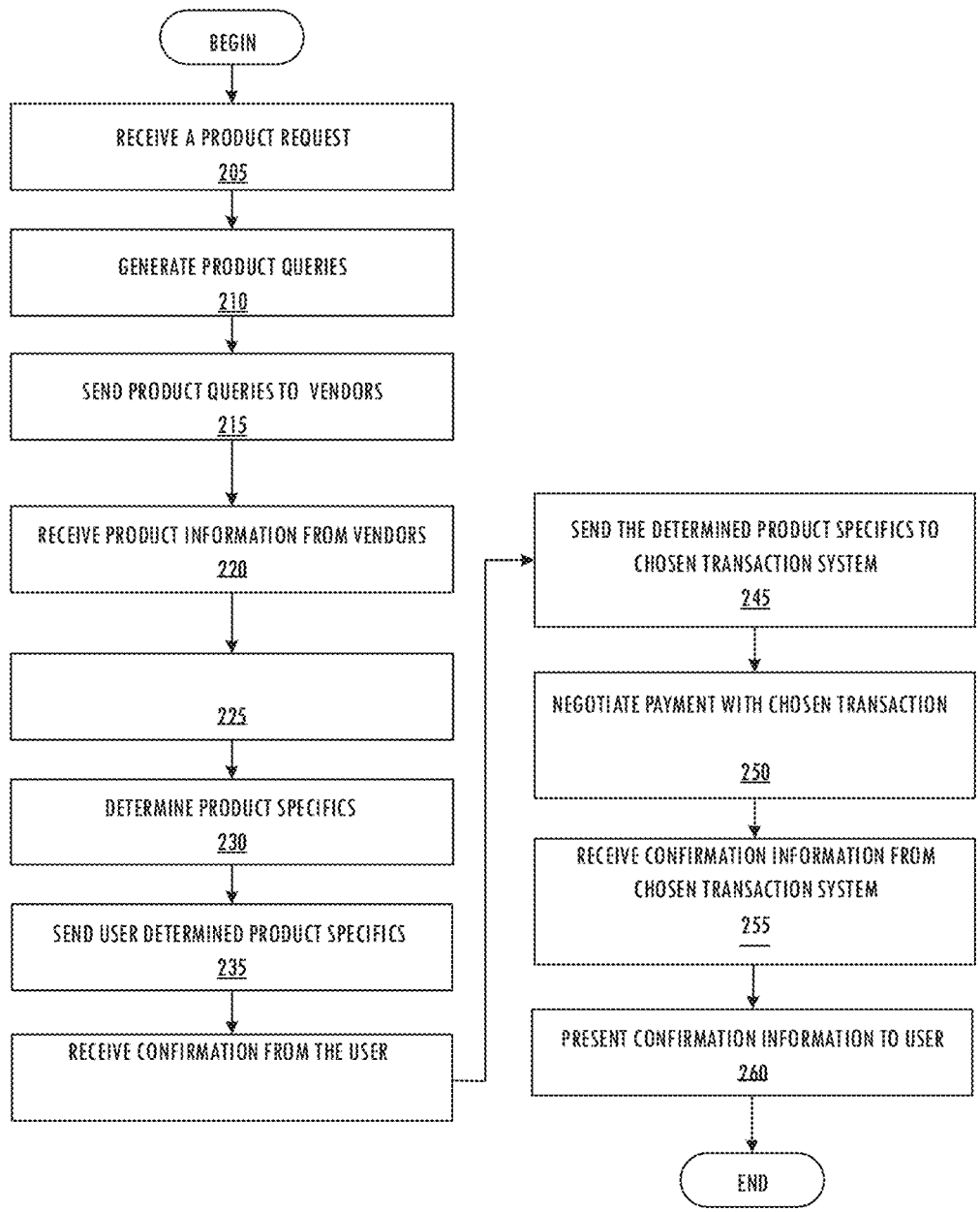
FIG. 2 shows, in flow chart form, an example method for facilitating online shopping according to one or more embodiments

FIG. 2 shows, in flow chart form, a method for facilitating online purchasing. For purposes of explanation, the following steps will be described in the context of FIG. 1. However, it should be understood that the various actions may be taken by alternate components. In addition, the various actions may be performed in a different order, while some actions may be performed simultaneously, and some may not be required, or others may be added, according to various embodiments. The flow chart begins at 205, where NOWW shopping application 1180 receives a product request from a user.

As discussed previously, in some embodiments the product request may comprise a link from a social media site, a QR code, a bar code, an embedded, proprietary, smart or RFID code, a voice command, mouse clicks, a touchscreen input, a keyboard input, an image or photograph, or a unique icon associated with a product in a database stored in NOWW shopping application 1180. For example, if the product request is a QR code, NOWW shopping application 1180 may receive the QR code from a camera or bar code reader included in sensors 1130. Continuing at 210, NOWW shopping application 1180 generates one or more product queries.

In some embodiments, the one or more product queries may be based at least in part on the product request. For example, if the product request is a QR code, NOWW shopping application 1180 may decode the QR code and base the one or more product queries on the decoded QR code.

Alternatively, NOWW shopping application 1180 may export the QR code to another application stored in memory 1160 in electronic device 1100 or memory 1230 in secondary electronic device 1200 for decoding and receive the decoded information before generating one or more product queries.

In some embodiments, NOWW shopping application 1180 may use machine learning, deep learning, neural networks, or artificial intelligence to generate the one or more product queries.

In some embodiments, NOWW shopping application 1180 may export the processing-intensive image recognition actions to a third party server. At 215, NOWW shopping application 1180 may send the product queries generated in 210 to multiple vendors.

In some embodiments, the multiple vendors may include single brand vendors like Adidas®, or marketplace vendors, like Ebay or Amazon. (ADIDAS is a registered trademark of Adidas AG Joint Stock Company, Federal Republic of Germany. AMAZON is a registered trademark of Amazon Technologies, Inc.)

In one embodiment, multiple vendors may be selected from a list of vendors a user has previously purchased from stored as part of the user's user profile.

In other embodiments, NOWW shopping application 1180 may send the one or more product queries to a more general search engine, such as Google or a commercial database, such as Google images, and select the vendors from the general search's results. In another embodiment, a proprietary or other code (e.g., QR code) can be embedded to be read directly from a Google search via augmented reality or virtual reality, hologram, watermark or other method initiated by the payor. The user (payor) may click or touch the image of the object to initiate ordering. In one embodiment, the NOWW shopping application communicates the order to the vendor along with conveying the user's shipment address and payment (either full payment or less a discount paid to NOWW shopping application). The vendor may utilize shipment directly from its own inventory or from a source such as Amazon.

Alternatively, as discussed previously, NOWW shopping application 1180 may send the product queries to a proprietary NOWW shopping application database containing product information.

The flow chart continues at 220, where NOWW shopping application 1180 receives product information from the plurality of vendors. At this step, the app may also initiate a search for similar items.

Alternatively, NOWW shopping application 1180 can receive product information from their own or a local database (e.g., stored on electronic device 1100).

In some embodiments, the product information may be obtained from an open application programming interface (API).

In some embodiments, the product information may include available sizes, colors, costs, shipping options, product dimensions, product strengths and characteristics and the like.

In other embodiments, where the list of vendors includes marketplace vendors, NOWW shopping application 1180 may use machine learning, deep learning, neural networks, or artificial intelligence to interpret the product information.

Next, at 225, NOWW shopping application 1180 may retrieve a user profile.

In some embodiments, the user profile may include the user's purchasing history, purchasing preferences including preferred vendors, and discount information.

In other embodiments, the user profile may include one or more modelled objects. The modelled objects may include modelled objects of the user, rooms in the user's home, people for whom the user purchases gifts, and other people, objects, and environments.

As discussed previously, the order of operations is not fixed and NOWW shopping application 1180 may retrieve the user profile before sending the product queries to one or more vendors.

Product Specifics

At 230, NOWW shopping application 1180 may determine product specifics based at least in part on the user profile and the product information received from the vendors in response to the product request. For example, NOWW shopping application 1180 may determine a correct product size for the user based on the vendor product information, including product specifications received from the vendors and a modelled object included in the user profile. Alternatively, the correct product size may be determined from the user's purchasing history.

In some embodiments, NOWW shopping application 1180 may determine a particular vendor based at least in part on product availability, cost, and the user's purchasing history, or by user selection. For example, NOWW shopping application 1180 may extrapolate the user's preference for single brand vendors, rather than marketplace vendors, from the user's purchasing history via machine learning, deep learning, neural networks, or artificial intelligence and set single brand vendors as the user's preferred vendors.

In other embodiments, NOWW shopping application 1180 may use machine learning, deep learning, neural networks, NLP or other artificial intelligence technology to suggest correct product size, determine a particular vendor, display product information and the like. For example, prior purchases of Adidas shoes may have been size 9 while purchases of Nike shoes were size 10. Machine learning may suggest a product size based comparing vendor product specifications with the user profile.

The flow chart continues at 245, when NOWW shopping application 1180 sends the user the determined product specifics, i.e., feedback from the vendor information and the User product request or specifics based upon the user profile and vendor information. The user may then confirm or override one or more of NOWW shopping application 1180's determined product specifics. For example, in one embodiment, the user may choose a different product size or color than suggested, confirm the determined payment method and vendor, or request customization.

The user may also consider product reviews by friends and other purchasers or send the determined product specifics to friends included on a friends list in the user profile for advice and opinions before purchasing.

User Confirmation

At 255, NOWW shopping application 1180 receives confirmation from the user of the determined product specifics. In a number of scenarios, both before and after NOWW shopping application 1180 receives the user's confirmation, NOWW shopping application 1180 may present the user with a game of some kind with the chance of winning a discount, free shipping, a free gift or add-on item, and the like.

At 260, NOWW shopping application 1180 sends the determined product specifics to a chosen vendor's transaction system.

In some embodiments, NOWW shopping application 1180 may send the determined product specifics as a purchase order to a vendor.

In other embodiments, NOWW shopping application 1180 may use the determined product specifics to complete a purchasing form available from the chosen vendor's transaction system. This can be the aggregator, e.g., Amazon, or vendor site.

Alternatively, NOWW shopping application 1180 may execute the items as an order and send the determined product specifics to a vendor portal for retrieval by the chosen vendor's transaction system. As discussed previously, the NOWW shopping application 1180 provides a vendor agnostic shopping cart (wherein there is no vendor preference) for the quick and easy purchase of products from multiple vendors and instant execution of the purchase from within the product page of the NOWW shopping application 1180.

Next, NOWW shopping application 1180 negotiates payment with the chosen vendor's transaction system at 265. For example, NOWW shopping application 1180 may present a discount to the chosen vendor's transaction system. It may present vendor shopping code discount or user reward discount, all as may be contained in the user profile.

In some embodiments, confirmation information may include receipt and tracking information.

At 260, NOWW shopping application 1180 presents the confirmation information to the user. In some embodiments, after the purchase has been made, NOWW shopping application 1180 may invite the user to a game of some kind to compete with other users who have made the same or a similar purchase within a certain period of time or a certain geographical area, or who have similar purchasing histories, and the like to create a socially interactive and engaging network activity in the instant or near term timeline. The one or more users who win the game may receive a discount, free shipping, a free gift or add-on from either NOWW shopping application 1180 or from the vendor the product was purchased from.

In other embodiments, after the user has won a certain number of times, NOWW shopping application 1180 may gift the user a certain amount of branded or generic shopping digital currency or other award. In some embodiments, the gift of digital currency or other awards may come from a vendor instead of or as well as from NOWW shopping application 1180.

Figure 3:
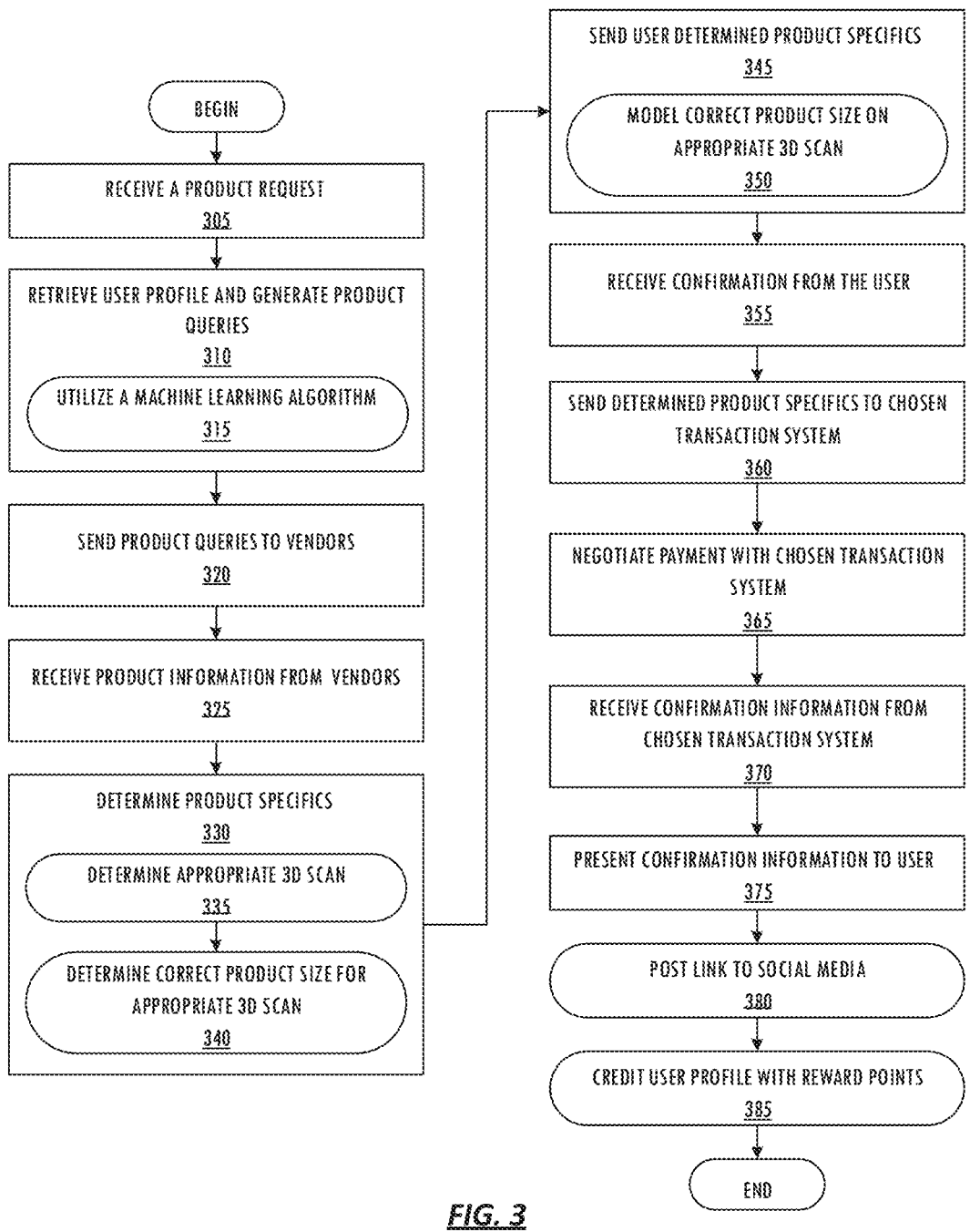
FIG. 3 shows, in flow chart form, a further example method for facilitating online shopping, including modelling a correct product size on an appropriate modelled object and posting a link to the product determination to a social media site.

FIG. 3 shows, in flow chart form, another method for facilitating online shopping according to one or more embodiments. In some embodiments, certain actions take place as part of generating one or more product queries while other actions take place as part of determining product specifics and presenting to a user the determined product specifics. Still other actions comprise additional functionality. For purposes of explanation, the following steps will be described in the context of FIG. 1. However, it should be understood that the various actions may be taken by alternate components. In addition, the various actions may be performed in a different order. Further, some actions may be performed simultaneously, and some may not be required, or others may be added.

The flow chart begins at 305 where NOWW shopping application 1180 receives a product request. The request may be initiated simply by a user holding up a smart phone or other device to an image. The NOWW shopping application, retrieving or identifying the image, may identify a product using either a database or online search and image recognition software such as Google Lens or Pinterest Lens. For example see U.S. Pat. No. 7,8341,082 issued to Michael Harville, assigned to Hewlett Packard Development, issued Nov. 9, 2010 and entitled "Method for Visual-Based Recognition of an Object". This patent is incorporated in its entirety herein by reference. See also U.S. Pat. No. 6,285, 393 issued to Hiroshi Shimoura et al., and assigned to Toyota Motor Corp entitled "Object Recognition Apparatus and Method". As discussed previously, in some embodiments the product request may include a link from a social media site, a bot request, an ioT request, a photo, image recognition, a QR code, a bar code and the like; a voice command, a touchscreen input, a keyboard input, an image, or a unique icon associated with the product in a database stored in NOWW shopping application 1180. For example, if the product request is a QR code, NOWW shopping application 1180 may receive the QR code from a camera included in sensors 1130.

In some embodiments, NOWW shopping application 1180 may present a virtual or mixed reality environment corresponding to a brick and mortar store. It may also identify a product in a store window via a NOWW shopping application icon or code facilitating instant purchase capability. From this presented environment, a user may browse available products for the "shopping experience" from anywhere. A user-selected product from this presented environment may serve as the product request.

At 310, NOWW shopping application 1180 retrieves a user profile and uses said profile to generate one or more product queries. The user profile may contain information entered by the user when registering with the NOWW shopping application. The information may include clothing sizes, health allergies, dimensions of housing living areas and the like. The user profile can be updated by the NOWW shopping application from user input using machine learning software or other technology. (The machine learning software or other shopping algorithm may be proprietary. Alternatively, the technology may be provided by a third party.) See U.S. Pat. No. 8,510,298 issued Aug. 13, 2013 entitled "Method for Relevancy Ranking of Products in Online Shopping" to Shashikant Khandelwal, as one example for machine learning in online shopping. This patent is incorporated by reference herein in its entirety.

In some embodiments, the user profile may include the user's purchasing history, purchasing preferences including preferred vendors, and discount information. Utilizing and incorporating purchase, health, life style, etc., information, enhanced by machine learning, increases the value of the NOWW shopping application to the user over time. The responses to search requests will become more tailored to the user desires and preferences over time, thereby decreasing search time and parsing search results. In addition, the option is created to "call" or check user profile for product specifications to check against user preferences as such preferences have been updated or enhanced using machine learning, artificial intelligence or user inputs.

In other embodiments, the user profile may include one or more modelled objects. For example, the modelled objects may include 3D or 4D scans of the user, rooms in the user's home, and people for whom the user purchases gifts. In another example, the user profile may include black and white lists of vendors the user will use or not use based on previous bad experiences (black lists) or prefers based on previous good experiences (whitelists).

In this way, the user profile informs the user which (preferred) vendors the product queries are sent to. Generating product queries may optionally further comprise step 315. As discussed above, the enhanced user profile allows smart or tailored product searches to be generated for the benefit of the user. For example, a product request may automatically be expanded to include similar items if the identified product is not available. Also, the user may initiate sending an inquiry for input to a third party wherein this input includes description or image of the product request.

It will be appreciated throughout this disclosure that this is a method of more accurate or smarter/tailored shopping will reduce the number of incorrect items being shipped. Incorrect or unsuitable shipments require returns and return shipments. The totality of the inaccurate shopping results in increased waste of packaging material and energy consumption in transporting the incorrect shipment and the resulting return shipment.

At 315, NOWW shopping application 1180 uses artificial intelligence including machine learning, deep learning, neural networks, algorithms, NLP, vision, or a combination to generate one or more product queries. For example, if the product request is text input from a keyboard, NOWW shopping application 1180 may use artificial intelligence including machine learning, deep learning, neural networks, algorithms, etc., to interpret the text input to generate one or more product queries.

Continuing at 320, NOWW shopping application 1180 sends the one or more product queries to one or more vendors and will check for availability. Alternatively, NOWW shopping application 1180 may send the product queries to a proprietary NOWW shopping application database containing product information. This proprietary NOWW database may be specific to the user.

At 325, NOWW shopping application 1180 receives product information from the vendors (based upon the product queries). Alternatively, NOWW shopping application receives product information from the proprietary NOWW shopping application database. As discussed previously, in some embodiments the product information may include available sizes, colors, health warnings, costs, shipping options, product dimensions, and the like.

The flow chart continues at 330 where NOWW shopping application 1180 determines product specifics. Determining product specifics may also include actions 335 and 340.

At 335, NOWW shopping application 1180 determines an appropriate modelled object from the user profile to use. For example, if the product request indicates an article of women's clothing, NOWW shopping application 1180 may choose the modelled object associated with a woman. The modelling step may include an avatar created by the user showing the user's size, physical attributes, skin and hair coloring etc. Alternatively, NOWW shopping application 1180 may use the purchasing history to determine the appropriate modelled object. Recall the user may select the appropriate modelled object up front via user input or override NOWW shopping application 1180's choice and self-select a modelled object.

At 340, NOWW shopping application 1180 determines or suggests a correct product size for the appropriate modelled object. It will be appreciated that the determination of the appropriate 3D scan may include viewing an object in context of a physical space of interest to the user. This can be furniture simulated to be positioned in various location within the user's living space. The object may be correctly sized or dimensioned for the depicted user living space.

In some embodiments, the correct product size or characteristic is determined using at least the product information received from the vendors and the appropriate modelled object. For example, the modelled object will provide NOWW shopping application 1180 with the necessary measurements of the user to choose a correct size based on cross reference with the product dimensions in the product information provided by the vendors or local database.

In other embodiments, the correct product size is determined based on at least the user's purchasing history, as may be enhanced using machine learning/user shopping algorithms. For example, product requests or inquiries for wall art may be filtered for large object pieces based upon user's past selections.

In further embodiments, the correct product size is determined based on at least the user's body size and measurements. For example, if the user has previously purchased a product from brand A, NOWW shopping application 1180 may base the correct product size on the product size chosen in the previous purchase, or via machine learning, deep learning, neural networks, AI or other, based on a collection of previous purchases.

Note determining product specifics may include determining a recommended color, context, or environment for the product or similar.

The flow chart continues at 345 when NOWW shopping application 1180 sends the user the determined product specifics from 330. Sending the user the determined product specifics may optionally further comprise actions in accordance with 350, i.e., modelling the suggested items.

At 350, NOWW shopping application 1180 models the correct product size using the appropriate modelled object or avatar or via "Intelli-size", a machine learning cross referencing tool (including 360° rotation) of shopping preferences. The modelling or avatar positioning or view may be manipulated by the user (or third party receiving the information from the user) so that better decisions can be made in the purchasing process.

In some embodiments, NOWW shopping application 1180 models the correct product size on the appropriate modelled object at different angles or in motion itself. This may be referred to as 4D modelling.

In other embodiments, NOWW shopping application 1180 may send the correct product size to virtual, mixed or augmented reality application 1240 for augmented reality application 1240 to model and display to the user (recall, augmented reality application 1240 may execute and display on electronic device 1100). Alternatively, the user may select items to be displayed by augmented reality application 1240 and try items in a virtual or mixed reality environment in their world.

It will be appreciated that the user determined product specifics 345 or the modeled product 350 may be sent by the user to a third party possessing a secondary electronic device 1200 as described in FIG. 1. This step may be initiated via various media platforms such as Facebook, or similar. The third party will have an opportunity to review the product specifics chosen by the user or the product modelled in the user's living space, etc., 1240. In this embodiment, the third party may have the opportunity to comment upon the displayed object. In this embodiment, the third party may be the user's design consultant. In other circumstances the roles of the parties may be reversed and it may be the design consultant submitting the product specifics or modelled object to the client user. The NOWW shopping application may provide credit or rewards to the user or to the third party, e.g., a micro-advertiser, based upon the sharing or recommendation activity.

In another embodiment, the machine learning enhanced user profile may initiate a suggestion of related items complimentary of the user selected object. This may be a clothing ensemble appropriate for a selected article of clothing or jewelry. Alternatively, it may be a decorating accessory appropriate for a selected item of furniture. In another embodiment, the enhanced user profile may select items already in possession of the user (user inventory) that may be worn with the clothing or positioned with the furniture. Again, this activity may generate rewards or credit points or compensation to the third party or the user.

At 355, NOWW shopping application 1180 receives confirmation from the user of the determined product specifics.

In some embodiments, the user may override the determined product specifics and designate new determined product specifics for NOWW shopping application 1180 to use instead. For example, the user may choose a different product size according to personal preference or request customization. This addition to the user's purchase history may be incorporated into the user's profile. Alternatively, the user may select to have the differing size (or other change in parameters) to become a change versus an alternative. See FIG. 15 as an example of this function.

It will be appreciated that the user selection, including photo of actual modelling or virtual modelling using an avatar can be posted on the Internet, e.g., social media, for "micro-advertising" by the user. As explained elsewhere, vendor sales to other's resulting from user micro-advertising may result in compensation being paid to the user.

In another embodiment, the user's selection in response to the product request and resulting product specifics may result in the user being directed to a "nearest" or convenient store that has the confirmed item (in the correct size, style, color, etc.) in stock.

At 360, NOWW shopping application 1180 sends the determined product specifics as confirmed by the user at 355 to one or more chosen vendor's transaction systems. As discussed previously, in some embodiments, NOWW shopping application 1180 may send the determined product specifics as a purchase order. In other embodiments, NOWW shopping application 1180 may use the determined product specifics to complete a purchasing form available on a chosen vendor's transaction system. Alternatively, NOWW shopping application 1180 may execute the purchase and/or deduct a percentage before executing the purchase with NOWW shopping application wallet and then send the determined product specifics to a vendor portal for retrieval by the chosen vendor's transaction system. Next, NOWW shopping application 1180 may coordinate with NOWW shopping application wallet to negotiate payment with the chosen vendor's transaction system at 365.

In some embodiments, NOWW shopping application 1180 may present a discount stored in the user's profile, NOWW credit or rewards, or vendor-provided credits or rewards to the chosen vendor's transaction system.

In other embodiments, NOWW shopping application 1180 may deduct its portion of the sale.

The flow chart continues at 370, where NOWW shopping application 1180 sends or receives confirmation information from each chosen vendors' transaction system. The user may receive order confirmation and shipping information from the NOWW shopping application or the vendor. As discussed previously, in some embodiments, the confirmation information may include a receipt and shipping information.

At 375, NOWW shopping application 1180 may present the confirmation information to the user. In some embodiments, NOWW shopping application 1180 may mediate delivery and tracking communications between a chosen vendor's transaction system and the user. In the event the product is a NOWW shopping application product, to its chosen delivery partner.

It will be appreciated that NOWW shopping application may expand to market its own products to users.

Through blockchain, RFID, digital communications, and the like, inventory may be assessed or adjusted in real time and the entire supply chain may be accessed, or readable or interconnected via a distributed ledger or similar. The ledger or other device may be continuously updated at products move through the distribution chain, i.e., from the original manufacture, through (optionally) importation/customs, to distributors and suppliers and eventually to the purchaser (user).

The flow chart continues at 380, where NOWW shopping application 1180 posts or embeds a link of the purchased product to social media; (or via integration, an organic social media post can be NOWW-enabled via a readable code, watermark, icon or the like). As used herein, "organic" refers to purchasing activity initiated by the user without prompting by an advertisement. See for example FIG. 13 herein. In an alternative embodiment, the link of the purchased product may be sent to a friend's list by email, text, messenger, direct message, and the like or otherwise distributed. In some embodiments, this may act as advertising for the chosen vendor or the product. To reward the user for posting the product information to social media, NOWW shopping application 1180 can track and credit the user profile with reward points, currency, digital currency, or the like when the link to the product determination is viewed or clicked or purchased at 385 (e.g., by a third party). In some embodiments, NOWW shopping application 1180 may collect data on the user's advertising and provide that "influencing" data to the vendor for reward purposes. See FIG. 11 herein.

In this way, peer-to-peer advertising, influence, and/or network marketing by consumers is rewarded by discounts, reward points, currency, digital currency, free products, and the like from NOWW shopping application 1180, from vendors directly, or both.

In a separate embodiment, the NOWW shopping application 1180 may assign unique identification numbers (or use other identifying methodology) to each user to allow tracking of their advertising and influence contributions, i.e., micro-advertising. Alternatively, NOWW shopping application 1180 may allow users to consent to tracking that would monitor purchasing behavior both through and outside NOWW shopping application 1180, such as in-store purchasing.

Advertising rewards may be opted in to or out of and individual purchases may be excluded from advertising. Additionally, a user need not purchase a product to receive advertising benefits; simply sharing through social media or otherwise advertising the product may be sufficient to receive advertising benefits, such as payment.

In a separate embodiment a root tracking influence database allows NOWW shopping application 1180 to notify vendors of the amount of advertising each user (micro-advertiser) is providing the vendors, allowing vendors to directly reach out to successful individual 'micro-advertisers' for spokesperson recruiting, design collaborations, gaming 'easter eggs' (i.e., micro-advertiser rewards), and the like. NOWW shopping application 1180 may aggregate data to be shared or sold to vendors, data aggregators, or to be used for vendor-user design collaborations or partnerships in which users may begin building their own NOWW "Empire" and assist vendors in product creation, targeted advertising, partnerships, information exchanges, focus groups, and the like in exchange for rewards such as coupons, free shipping, profit sharing, endorsements, and the like. In some embodiments, the sharing of information may be a user option. This methodology may create a compensation method from vendors to the NOWW shopping application (or user/micro-advertisers) based upon the NOWW shopping application facilitating vendor sales.

The micro-advertiser may be identified by supplementation of an existing product bar code or other identifier. Alternatively, there may be a second identifier, e.g., bar code or watermark, etc., that may be virtual or appear via virtual reality or augmented reality on the scanned image that will identify the micro-advertiser in order that the micro-advertiser receives credit for initiating product request or sale.

In an embodiment, the UPC-A code may be supplemented by adding additional lines and spaces to increase the number of character from 10. (Also the UPC-E code may be utilized wherein the code comprises 6 characters.) It will be appreciated that every UPC-A code can be transformed to an EAN-13 code by prepending an 0 digit to the UPC-A code. Such codes can be read by POS scanners. The additional character spaces, e.g., spaces 12 to 18, can be used to identify the micro-advertiser.

In addition, a QR code, i.e., a 2D version of a UPC, can be expanded to provide additional identifiers. Note this variation would be an enhancement to the EAN-13 code. The QR code has a vertical and horizontal component. The QR (i.e., quick response) code consists of black squares arranged in a square grid with a white background. It can be read with imaging devices such as a camera. QR codes are used in advertising and can be scanned with a smart phone and converts the image into something such as a URL (thereby obviating the need to of the user to type in the URL into a browser). The QR code, scanned with a device such as a smart phone, can display text data, contact information, open a webpage in the phone browser, etc. Note also that QR codes can be used with an augmented reality system to show objects in a 3D space.

Also, and as stated above, a second mark or identifier may be used. For example, there may be two QR codes appearing in the image. One identifies the object and the second identifies the micro-advertiser.

NOWW shopping application 1180 may also facilitate the purchase of gifts in a number of ways. In one embodiment, NOWW shopping application 1180 may suggest determined product specifics including a size for a gift based on information from that person's NOWW shopping application user profile.

For example, two friends may both use NOWW shopping application 1180 and be listed as each other's friends. When one wishes to give a gift to the other, the NOWW shopping application 1180 may use the other's user profile to inform the suggested size, color choice, and the like or suggest products from the other's wish list where permissioned to do so. NOWW shopping application 1180 need not display information from the person's NOWW shopping application user profile in order to determine product specifics for the gift; all sizing information may be kept hidden or private to each person's user profile. For example, the user may instruct NOWW shopping application 1180 to purchase a particular wish list product under a certain dollar amount, according to the target user's user preferences. In another embodiment, NOWW shopping application 1180 may allow the user to send a product to a friend's NOWW shopping application user profile as a gift, where the friend may determine product specifics before shipment. NOWW shopping application 1180 may then send a confirmation without revealing product specifics back to the user for purchase completion.

In a further embodiment, NOWW shopping application 1180 may allow a user to prepay for a product and send the product as a gift to the receiving person to determine product specifics. In the above example, one friend may prepay for a product and send the product to the other friend for determination of product specifics, after which the determined product specifics will be sent to the chosen vendor and routed to the vendor portal as appropriate. In this way, the privacy of each user's profile is protected while facilitating the purchase of gifts. Additionally, a user may select an item from a friend's wish-list where the friend has made their wish-list public or even by dollar amount where the wish list is not public. Note that there are levels of permissions; some to friends, some public, etc. In some embodiments, NOWW shopping application 1180 may recommend products for gifts to a user based on the friend's prior purchases or via machine learning, deep learning, neural networks, artificial intelligence, an algorithm including user input, or the like.

Figure 4:
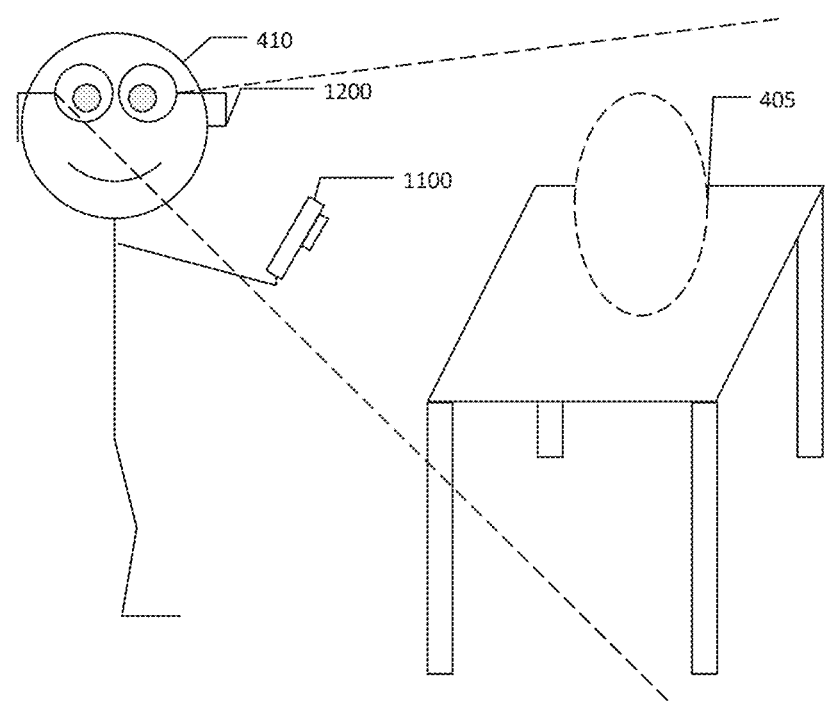
FIG. 4 shows, in system diagram form, an example setup of using an electronic device to model a product determination in conjunction with a secondary electronic device, according to one or more embodiments.

Referring now to FIG. 4, a system diagram is shown for an example setup for facilitating online shopping according to one or more embodiments. FIG. 4 shows a user 410 utilizing an electronic device 1100 to facilitate online purchasing. Electronic device 1100 contains NOWW shopping application 1180 to act as a user interface, for example, through a NOWW shopping application icon on a camera interface. The electronic device 1100 is connected to a secondary electronic device 1200, here a heads up display contained in a pair of goggles, via Bluetooth® or other communications technology. (BLUETOOTH is a registered trademark of Bluetooth Sig, Inc.) In this embodiment, secondary electronic device 1200 stores augmented reality application 1240 in memory 1230. Vase 405 is superimposed over a room by augmented reality application 1240 to model vase 405 for user 410's consideration before purchasing. In some embodiments, augmented reality application 1240 may model vase 405 through virtual rather than augmented or mixed reality.

Figure 5:
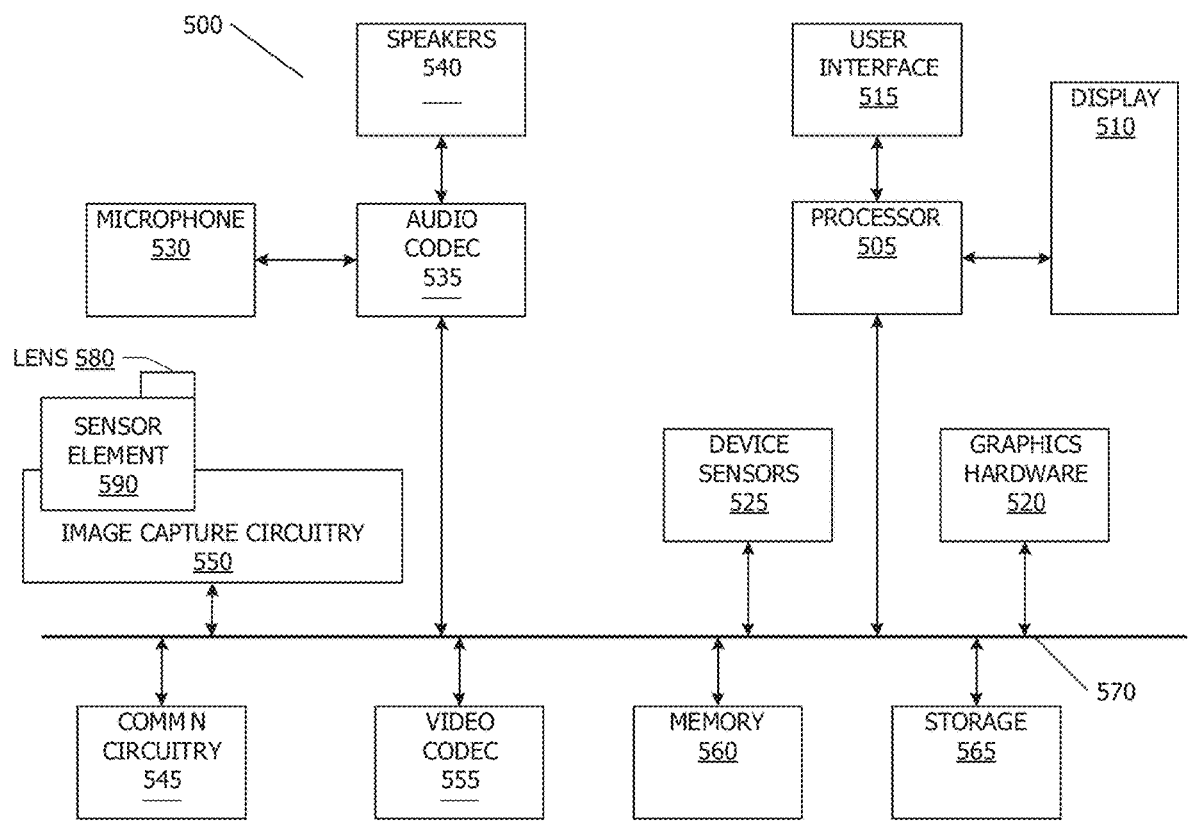
FIG. 5 shows, in block diagram form, a simplified multifunctional electronic device according to one or more embodiments.

Referring now to FIG. 5, a simplified functional block diagram of illustrative multifunction device 500 is shown according to one embodiment. Multifunction electronic device 500 may include processor 505, display 510, user interface 515, graphics hardware 520, device sensors 525 (e.g., proximity sensor/ambient light sensor, accelerometer and/or gyroscope), microphone 530, audio codec(s) 535, speaker(s) 540, communications circuitry 545, digital image capture circuitry 550, video codec(s) 555 (e.g., in support of digital image capture unit 550), memory 560, storage device 565, and communications bus 570. Multifunction electronic device 500 may be, for example, a personal electronic device such as a personal digital assistant (PDA), mobile telephone, or a tablet computer. Processor 505, display 510, memory 560, and storage device 565 may be of the same or similar type and serve the same function as the similarly named components described above with respect to electronic devices 1100 and 1200.

User interface 515 may allow a user to interact with device 500. For example, user interface 515 can take a variety of forms, such as a button, keypad, dial, a click wheel, keyboard, display screen, virtual display, and/or a touch screen, etc. Graphics hardware 520 may be special purpose computational hardware for processing graphics and/or assisting processor 505 to process graphics information.

In one embodiment, graphics hardware 520 may include a programmable GPU. Image capture circuitry 550 may include lens 580. Lens assembly may have an associated sensor element 590. Image capture circuitry 550 may capture still and/or video images. Output from image capture circuitry 550 may be processed, at least in part, by video codec(s) 555 and/or processor 505 and/or graphics hardware 520, and/or a dedicated image processing unit or pipeline incorporated within circuitry 555. Images so captured may be stored in memory 560 and/or storage 565. Sensor and camera circuitry 550 may capture still and video images that may be processed in accordance with this disclosure, at least in part, by video codec(s) 555 and/or processor 505 and/or graphics hardware 520, and/or a dedicated image processing unit incorporated within circuitry 550. Images so captured may be stored in memory 560 and/or storage 565. Microphone 530 may capture audio recordings that may be processed in accordance with this disclosure, at least in part, by audio codec(s) 535 and/or processor 505.

Audio recordings so captured may be stored in memory 560 and/or storage 565.

Figure 6:
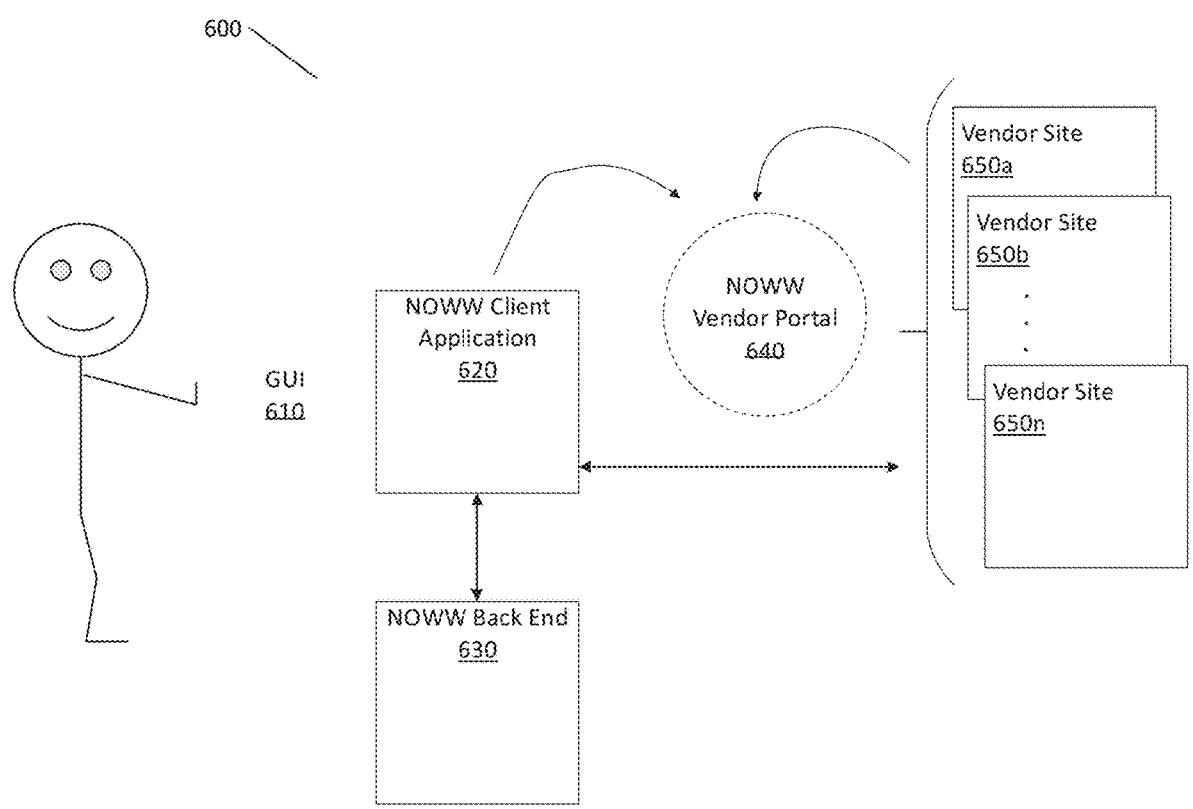
FIG. 6 shows, in system diagram form, an example set up of using an electronic device containing an illustrative application to facilitate online purchasing or related services, according to one or more embodiments.

FIG. 6 shows, in system diagram form, an example set-up 600 for using an electronic device containing the NOWW shopping application to facilitate online purchasing according to one or more embodiments. In FIG. 6, a user interacts with NOWW client application 620 through GUI 610. For example, the user may submit a product request to NOWW client application 620 through GUI 610. In some embodiments, the user may submit a product request through a virtual user interface. NOWW client application 620 may then send one or more product queries to vendor sites 650a, 650b, through 650n. Vendor sites 650a, 650b, through 650n may in turn send NOWW client application 620 product information corresponding to the one or more product queries. As discussed previously, the product information may be obtained from a local NOWW database instead. NOWW client application 620 may then interact with the user through GUI 610 to finalize determined product specifics, which it will then execute as an order and place in NOWW vendor portal 640. Then, one or more of vendor sites 650a-650n will retrieve the determined product specifics from NOWW vendor portal 640. Alternatively, NOWW client application 620 may send the determined product specifics directly to one or more of vendor sites 650a-650n.

Figure 7:
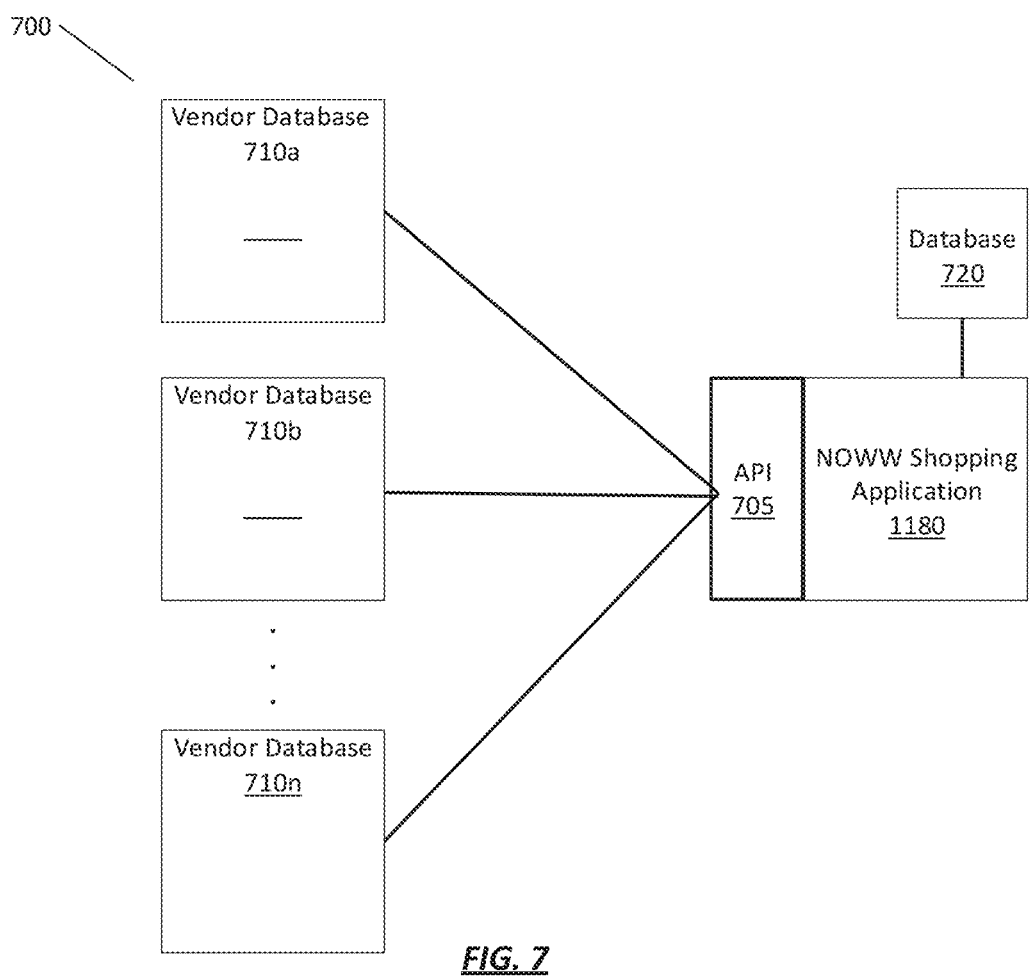
FIG. 7 shows, in block diagram form, an example application programming interface between the described shopping application and one or more vendor databases, according to one or more embodiments.

FIG. 7 shows, in block diagram form, an example application programming interface 705 between the NOWW shopping application 1180 and one or more vendor databases (710a, 710b, . . . 710n), according to one or more embodiments.

In FIG. 7, NOWW shopping application 1180 sends one or more product queries to one or more vendors via API 705, who in turn query their own vendor databases 710a-710n. In turn, NOWW shopping application 1180 receives product information from the vendors' databases 710a-710n. In this way, NOWW shopping application 1180 may obtain product dimensions, product availability, color information, materials, ingredients, information, shipping information, pricing, and the like from vendors. Alternatively, NOWW shopping application 1180 may search database 720 for product information related to the product queries. Database 720 may be stored in memory on the same electronic device as NOWW shopping application 1180, remotely on another device or via the cloud and accessed through a network connection including one or more servers. This memory may include information such as but not limited to product request, vendor supplied product information in response to product inquiries, or wish lists.

Figure 8:
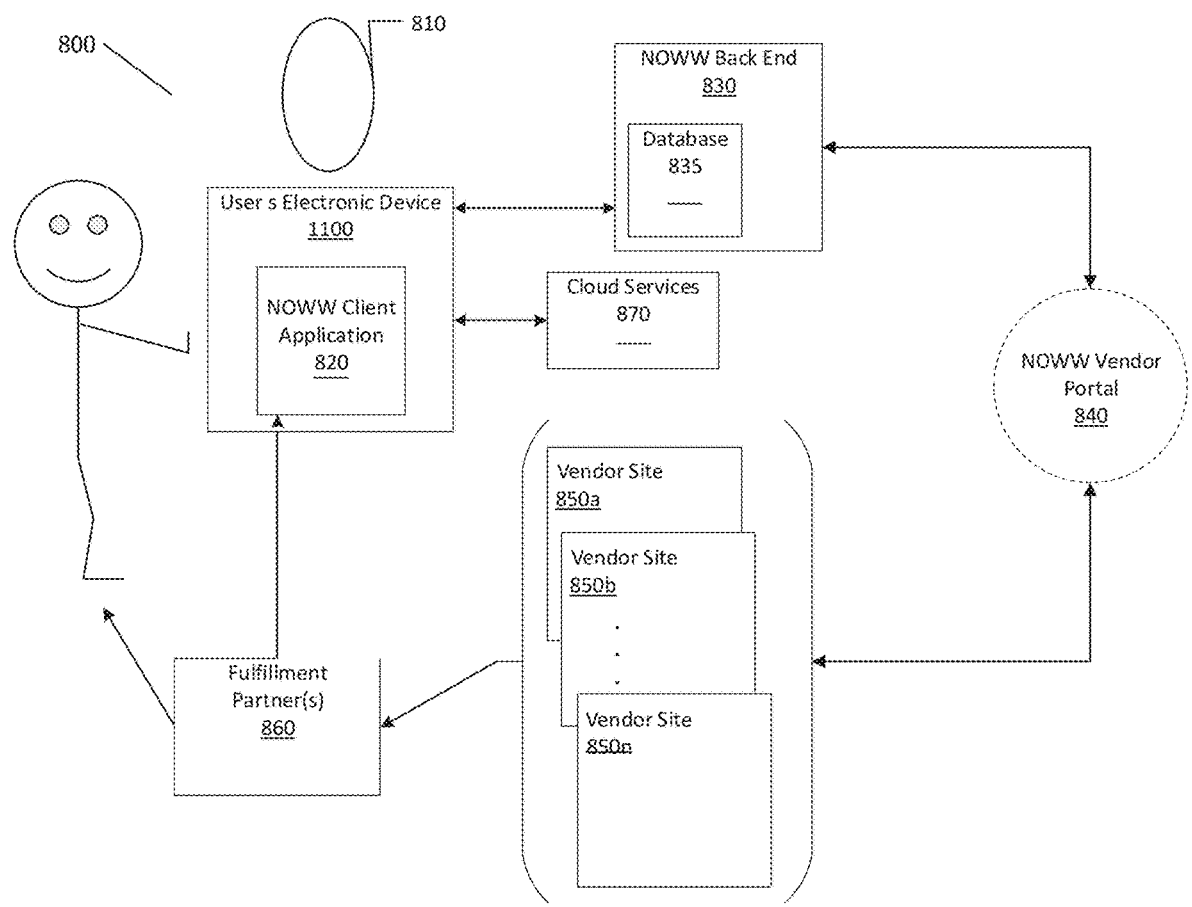
FIG. 8 shows, in system diagram form, an example set up of using an electronic device containing the described shopping application to facilitate online purchasing, according to one or more embodiments.

FIG. 8 shows, in system diagram form, an example system for using an electronic device containing the NOWW shopping application to facilitate online purchasing, according to one or more additional embodiments. As discussed previously in FIGS. 2 and 3, a user may use electronic device 1100 to submit a product request concerning vase 810 to NOWW client application 820. NOWW client application 820 will then generate one or more product queries based on the product request. If the product request is an image, NOWW client application 820 may send the image to cloud services 870 for image processing and recognition and generate the product queries based on the response from cloud services 870. NOWW client application 820 may send the product queries to NOWW shopping application back-end 830.

It will be appreciated that the back of the NOWW shopping application interfaces with a processor and database (including but not limited to the user profile). In contrast the front end of the NOWW shopping application is controlled by the user.

NOWW shopping application back-end 830 may use database 835 to search the product queries and obtain product information, send the product queries to vendor sites 850a-850n and receive product information from those vendors, or use an open API such as Google images and the like. Database 835 may contain product information, user profiles, games and rewards, purchases and orders, etc.

NOWW back-end 830 may then retrieve a user profile from database 835 and determine product specifics based on the product information and the user profile. NOWW shopping application back-end 830 may then send the determined product specifics to NOWW client application 820 for presentation to the user.

As discussed previously, NOWW client application 820 may offer the user color, size, and pricing recommendations, as well as present a virtual view, try or try-on, an augmented, virtual or mixed reality try-on, or an advertisement incorporating the user's three-dimensional scan. This may include use of a user avatar. NOWW client application 820 will then receive confirmation from the user of the determined product specifics or provide product specifics as modified by the user. NOWW client application 820 then sends the determined product specifics to NOWW back-end 830. NOWW back-end 830 may optionally separate the agnostic shopping cart's determined product specifics by chosen vendor as needed before sending the determined product specifics to the NOWW vendor portal 840. NOWW shopping application back-end 830 may execute the order, deduct its commission from the sale and then send the order to NOWW shopping application vendor portal 840.

Alternatively, NOWW shopping application back-end 830 may send the determined product specifics directly to vendor sites 850a-850n. Vendor sites 850a-850n may retrieve the determined product specifics from NOWW shopping application vendor portal 840. NOWW back-end 830 will then negotiate payment with the chosen vendors' transaction systems using the methods of payment stored in the user profile. NOWW back-end 830 may then receive confirmation information from the chosen vendor's transaction systems and send that confirmation information to NOWW client application 820 to be presented to the user. The vendor sites 850a-850n will then contact their fulfillment partners 860 to ship the product to the user or NOWW may build the integration to fulfillment directly. Fulfillment partners 860, e.g., fulfillment by Amazon, etc., may send notifications to NOWW client application 820. Note the entire process including the supply chain, may be replicated on blockchain, sidechains, Hedera Hashgraph (HH), ArkBlock/Blocklet, or other distributed ledger technology and the like; including the back end, vendor order routing, payment, inventory verification and adjustment, product authenticity, the origins of raw materials or ingredients, or background information for services and service providers, and other applications or processes. In some embodiments, NOWW client application 820 may work directly with fulfillment partners 860 to create proprietary products where NOWW client application 820 acts as a vendor to create proprietary branded products and services.

Figure 9:
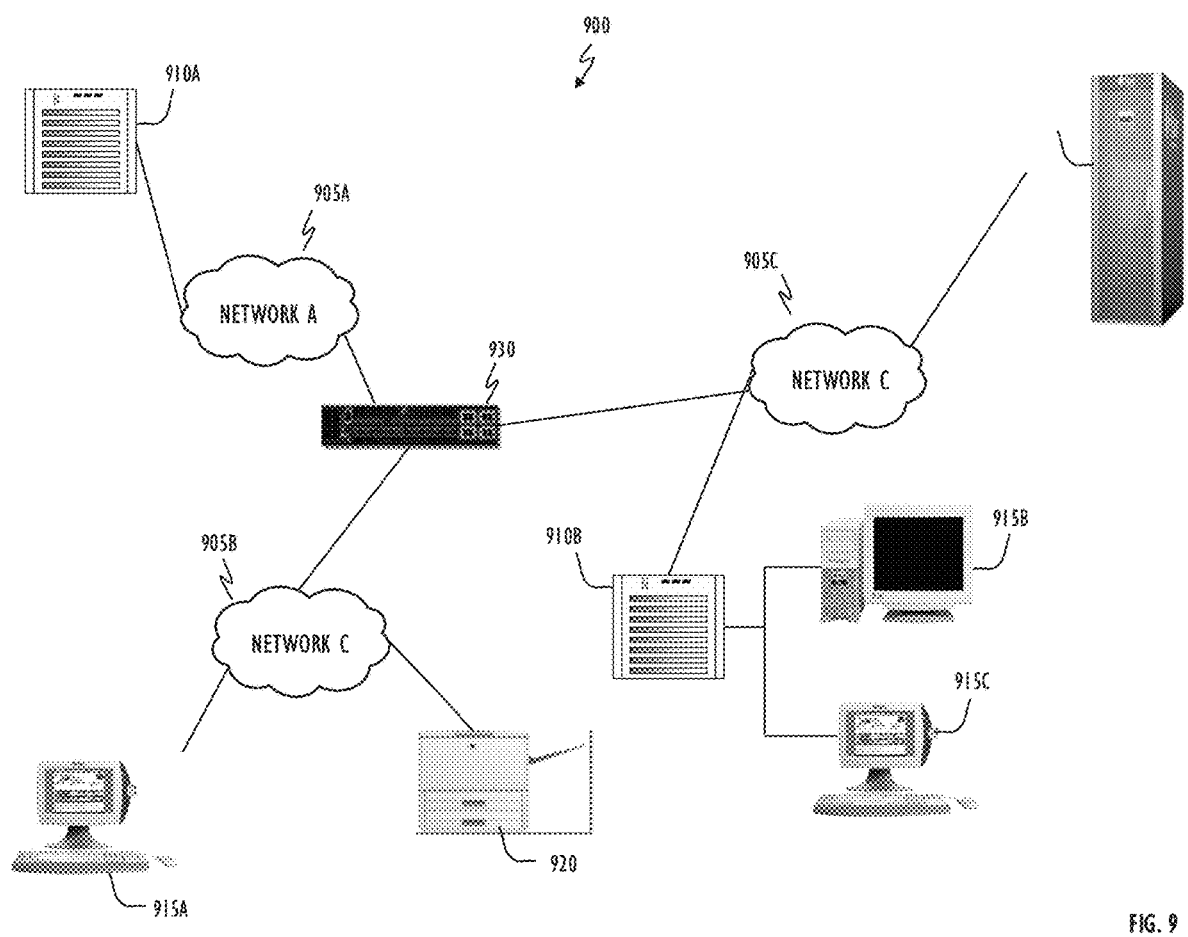
FIG. 9 shows, in block diagram form, a computer network in accordance with one or more embodiments.

Referring to FIG. 9, illustrative network architecture 900 within which a shopping application in accordance with the disclosed techniques may be implemented includes a plurality of networks 905, (i.e., 905a, 905b and 905c), each of which may take any form including, but not limited to, a local area network (LAN) or a wide area network (WAN) such as the Internet.

Further, networks 905 may use any desired technology (wired, wireless, cloud or a combination thereof) and communication protocol (e.g., TCP, or transmission control protocol and PPP, or point to point, or blockchain, sidechains, Hedera Hashgraph (HH), ArkBlock/Blocklet, or other distributed ledger/block chain technology or similar).

Coupled to networks 905 are data server computer systems 910 (i.e., 910a and 910b) that are capable of executing server applications such as database management applications and, further, are configured to communicate over networks 905.

One embodiment using server computers 910 may involve the operation of one or more central systems to process graphics information and distribute the processed information to nodes on a network.

Also coupled to networks 905, and/or data server computer systems 910, are client or end-user computer systems 915 (i.e., 915a, 915b and 915c). Client or end-user computer systems 915 may take the form of any computational device including, but not limited to, smartphones, gaming systems, tablet computer systems, desk-top or notebook computer systems, set-top box systems, entertainment devices or systems, televisions, or intelligent machines including embedded systems or distributed nodes and blockchain, sidechain, Hedera Hashgraph (HH), ArkBlock/Blocklet, or other distributed ledgers.

In some embodiments, network architecture 900 may also include network printers such as printer 920 and network storage systems such as 925. In some embodiments, printer 920 may be a 3D printer. To facilitate communication between different network devices (e.g., server computer systems 910, client computer systems 915, network printer 920 and storage system 925). Storage system 925 could, for example, be used to store multi-media items, privacy data, or other data that are referenced herein.

Figure 10:
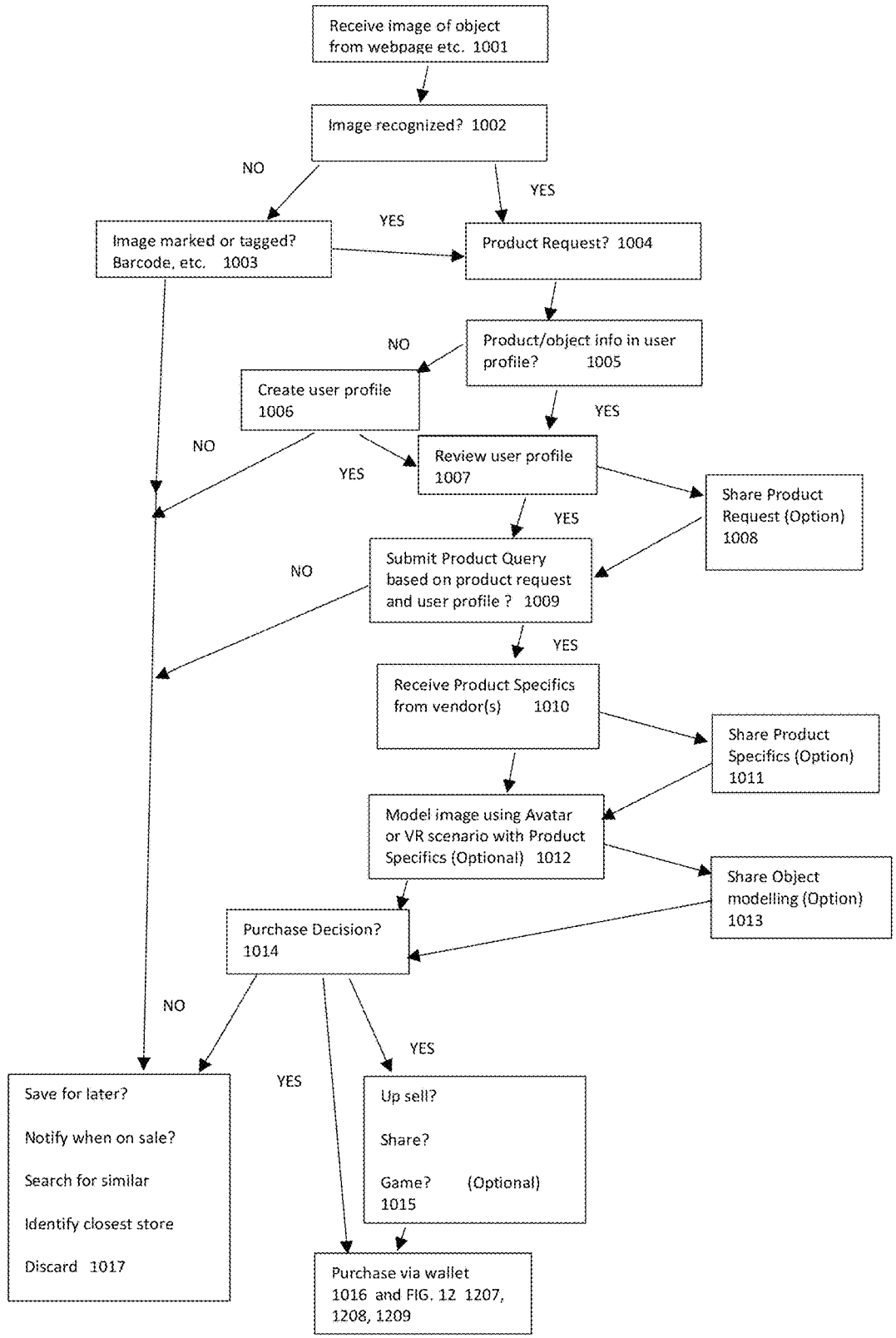
FIG. 10 illustrates an embodiment of an internet search utilizing one embodiment of the NOWW app.

FIG. 10 illustrates an embodiment of the NOWW shopping application used in an Internet search of an item. The method begins with receipt of an image of interest to the user 1001. If the object is recognized 1002 & 1003, a project request may be initiated and information received from one or more vendors 1004. The vendor information may be compared with a user profile 1005. If the user profile does not contain information related to the object of interest, the user may expand or supplement the profile 1006. In any event, the user may at this point seek advice or otherwise share information pertaining to the object to a third party 1008. This act of sharing may trigger reward or discount to the user. See FIG. 11 below.

Continuing with FIG. 10, the user may receive input from the third party and/or the user may submit a product query to the vendor or others utilizing information derived from the user profile, third party input or otherwise 1009. The user may receive a vendor response 1010 which again may be submitted to a third party 1011. At this stage, the user may also utilize virtual or augmented reality functions of the NOWW shopping application to model or contextually view the object 1012. It will be appreciated that this model or viewing function may be used as part of the proceeding steps, e.g., part of the review of the user profile 1007.

At this or a prior step, the user may make a purchase determination 1014. If purchase is confirmed, there may be an optional step 1015 wherein the user is given an opportunity to receive suggestions for related compatible items such as, for example but not limited to, collaborative suggestions based on the behavior of prior purchasers, sharing with others (third parties), posting the purchase decision (and perhaps receiving reward points or other compensation akin to a "micro-advertiser", or other opportunity for reward/discount, e.g., taking a survey). In any event, the purchase transaction may involve payment of the purchase price via a pre-established wallet or third party payment mechanism such as but not limited to Apple Pay® or Pay Pal® 1016. (Apple Pay is a registered trademark of Apple Corporation. PayPal is a registered trademark of PayPal, Inc.)

It will be further appreciated that, similar to making an affirmative purchase determination at one of several steps illustrated in FIG. 10, the user may decide not to make a purchase. The user's declination may nevertheless prompt affirmative actions, including but not limited to saving the search for possible later consideration, saving for further future discussion with others, receiving notification of vendor's future price reduction, initiation of a search for similar (and possibly lower price) item, or identification of the nearest brick and mortar store having the item 1017.

Figure 11:
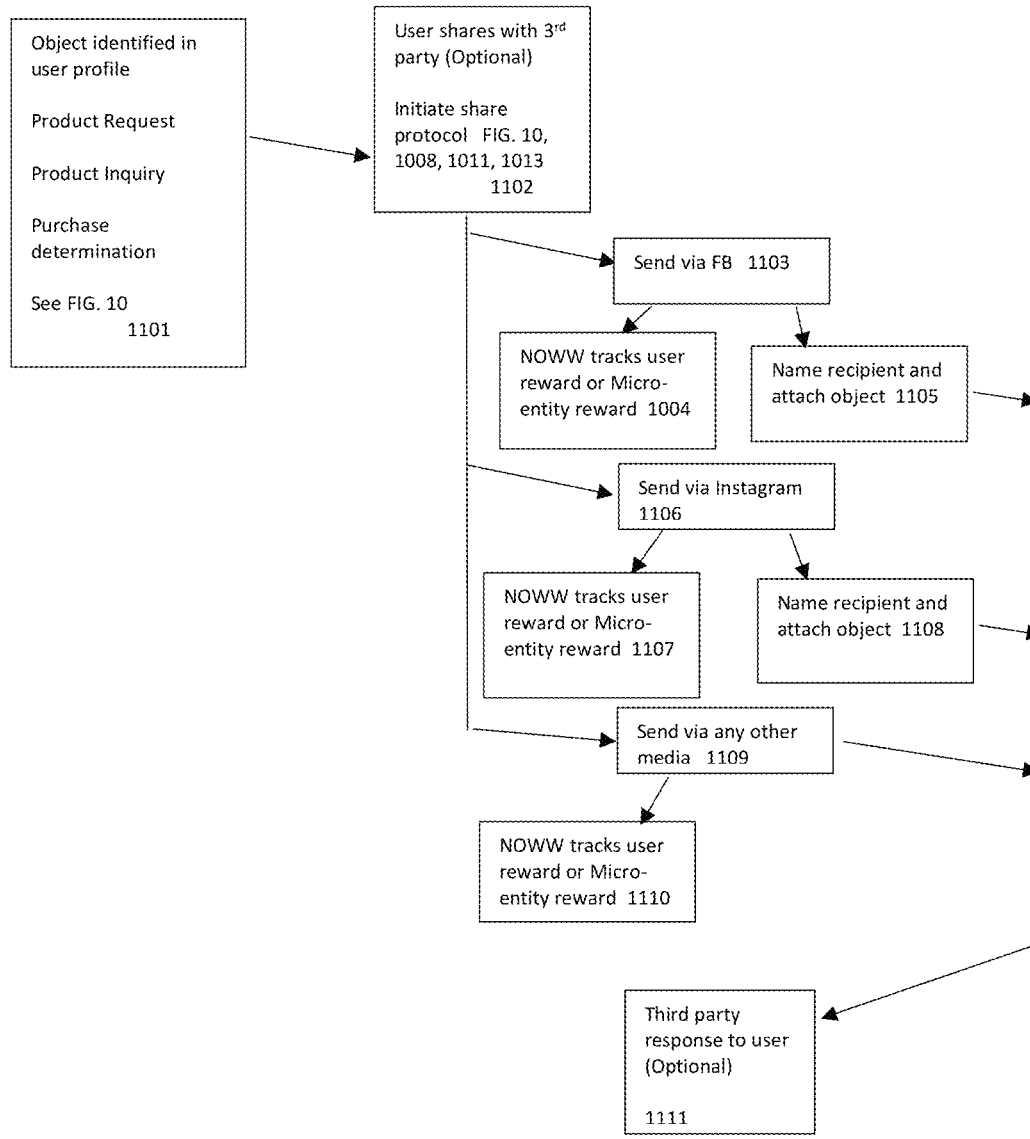
FIG. 11 illustrates an embodiment of a protocol that may be used by a user to share information, receive authorization, direction or suggestion from a third party regarding specification or purchase of an item of interest utilizing the NOWW app.

FIG. 11 illustrates an embodiment for the user sharing information or images (including modelling via an avatar or contextual viewing utilizing virtual or augmented reality) with a third party. See FIG. 10, 1008, 1009, & 1013. The sharing may be via social media, text messaging or other medium including but limited to Facebook, Twitter, Instagram, and email 1103, 1106, 1109.

In this protocol, the activity of the user or the third party may be tracked by the NOWW shopping application to enable such entity (user, third party, micro-advertiser, etc.) to receive reward or compensation. 1104, 1107, 1110.

Figure 12:
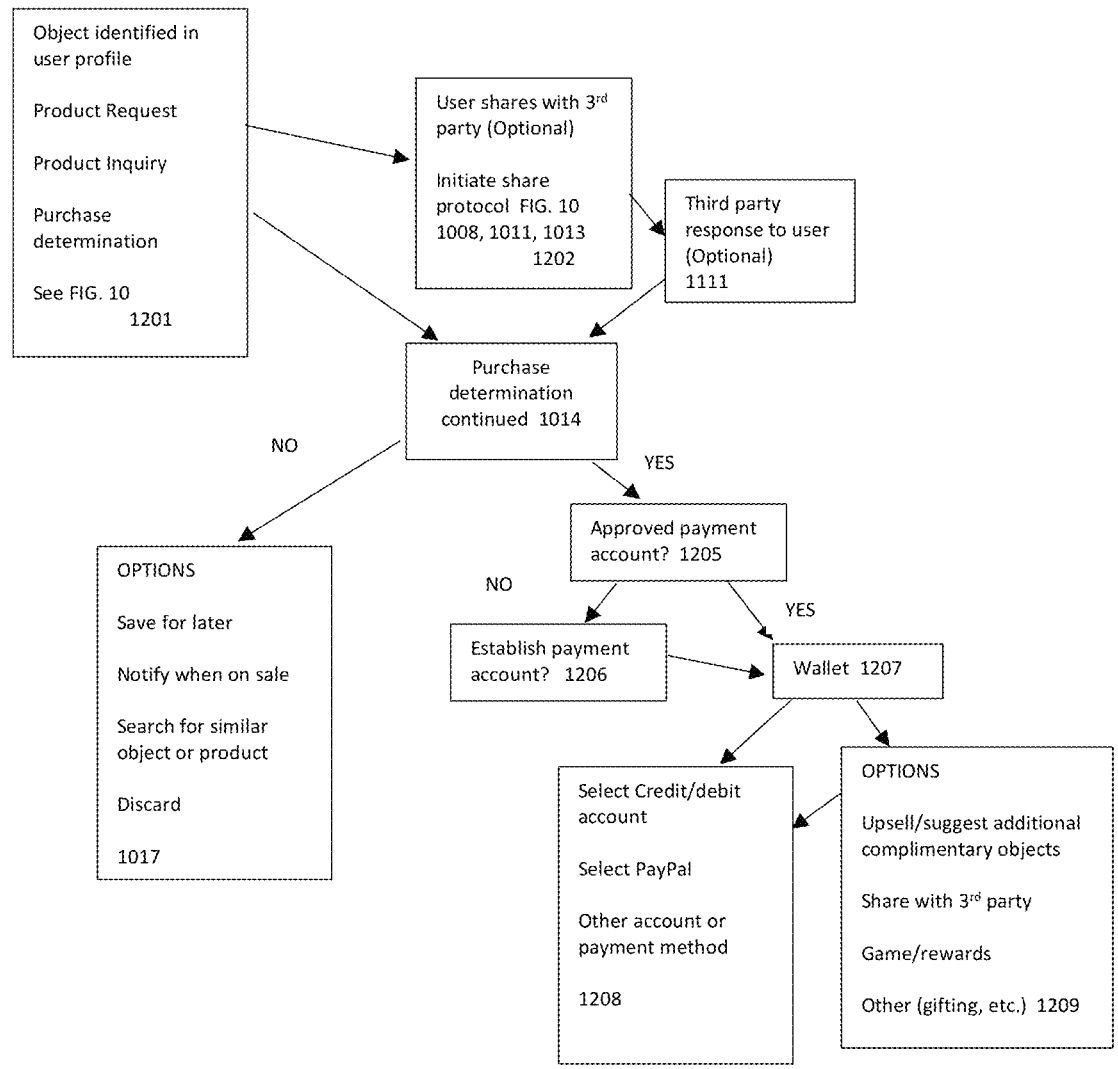
FIG. 12 illustrates an embodiment wherein the user executes or completes a purchase of an object via a wallet.

FIG. 12 illustrates a suggested protocol for accomplishing payment after an affirmative purchase determination has been made 1014 & 1205. The user may utilize a wallet containing pre-set information of credit/debit cards, gift cards, PayPal account information, Apple Pay information, etc. 1208. If the user has not previously established such a wallet, the user may be provided such an opportunity 1206.

It will be appreciated that most of the steps illustrated in FIGS. 10, 11 and 12 will facilitate prompt utilization of the NOWW shopping application to achieve review, selection and purchase of an item of interest. The expedited process or constituent protocols can be achieved with fewer mouse clicks or touching of screens or voice commands. The expedited use is achieved in part from the pre-established user profile and wallet.

Figure 13:
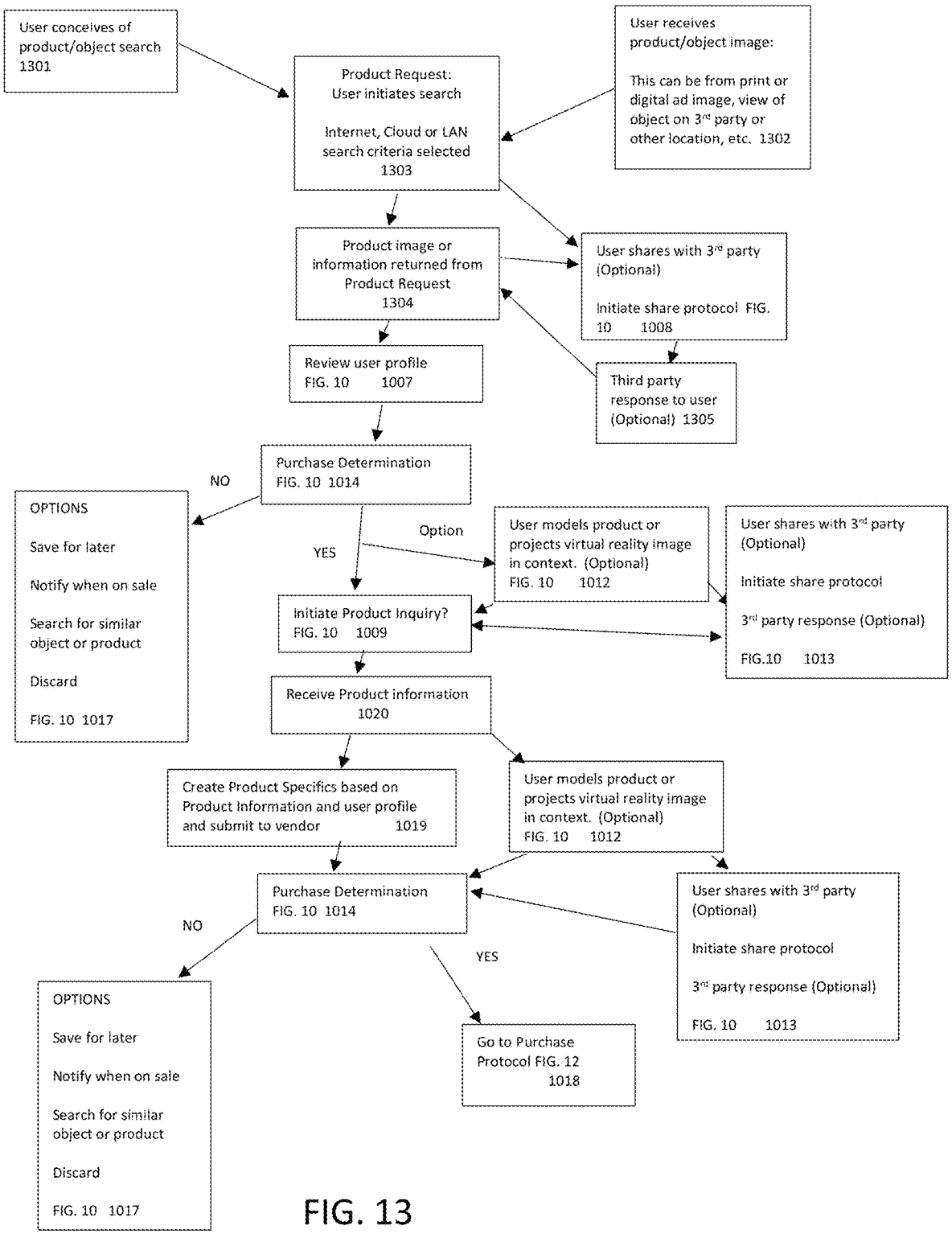
FIG. 13 illustrates an "organic" search, e.g., a search initiated by the user without preference to a particular vendor. IAWOE?? What does this mean??

FIG. 13 illustrates a further embodiment of the disclosure utilizing the NOWW shopping application. Illustrated is the initiation of an organic search, i.e., a search that may be initiated with a "blank page search screen" or search factual product information or information regarding unadvertised products. An organic search may be initiated by a third party suggestion or requirements of a design or procurement contract. Many steps of this organic search protocol are comparable to the steps of FIG. 10 discussed above. Note that the user may either individually conceive or initiate the search 1301, 1302 or the search may be prompted by one or more vendor ads 1302. The search may be conducted utilizing the cloud or a network such as the Internet 1303.

FIG. 14 is an illustration of one embodiment of categories of objects or items that may be contained in a user profile. More or fewer objects may comprise the user profile. Examples of items may be videos, books or subscriptions that are possessed or subscribed to by the user. This can include inventories, genre and preferred genre of items, etc.

Figure 15:
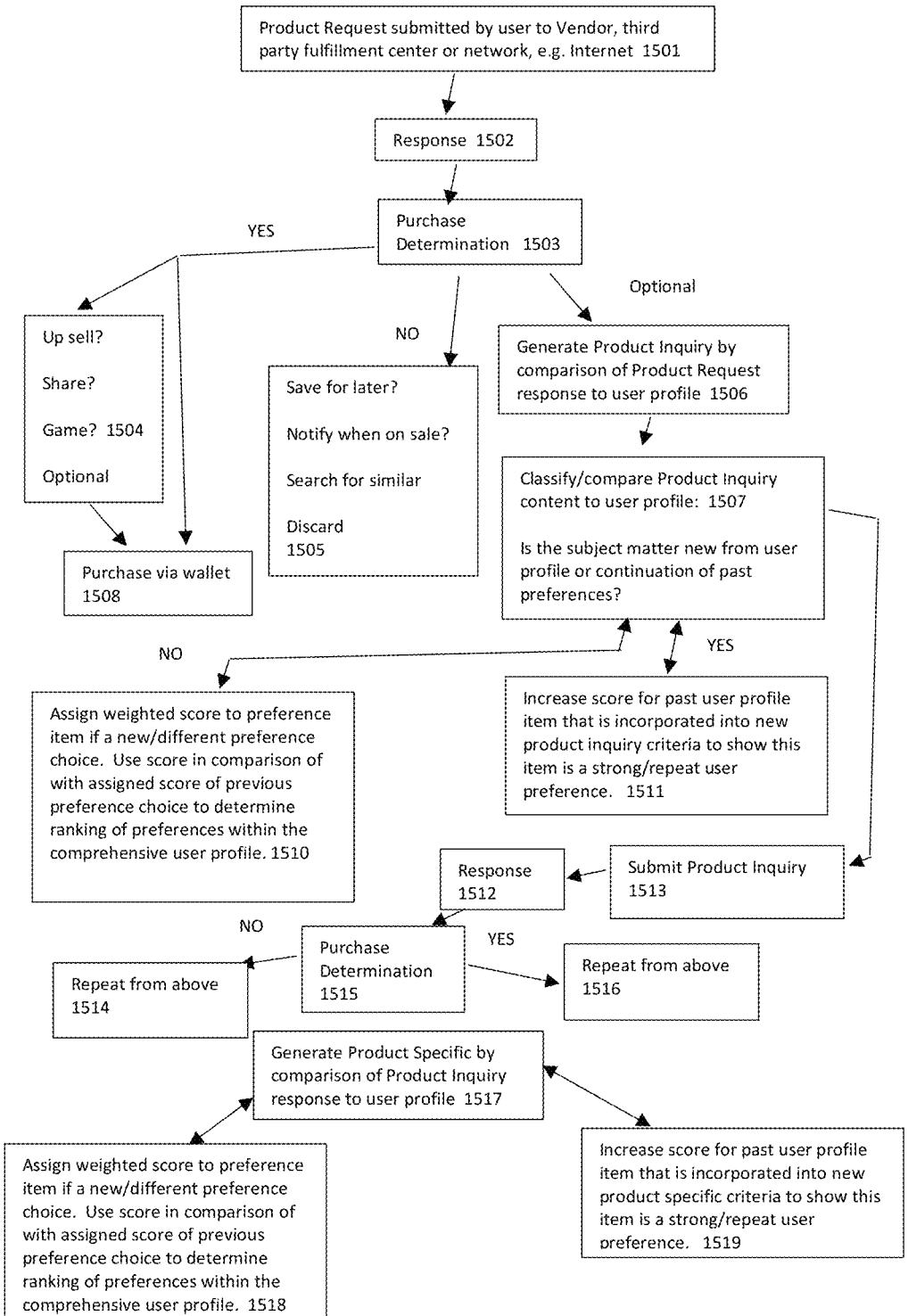
FIG. 15 illustrates one embodiment of artificial intelligence that is accomplished or enabled by the NOWW app. It should also be emphasized that this is only one example and other means for accomplishing "Intelli-buy" or more accurate shopping (thereby minimizing incorrect shipments with necessary returns, along with the resulting waste of time and resources).

FIG. 15 illustrates one example of artificial intelligence subject of this disclosure. As stated above, there are multiple methods or embodiments for utilization of machine learning. FIG. 15 discloses use of weighted scores to prioritize product options or attributes. The scores may be based upon the user's input at the creation of a user profile as well as the user's selection history.

Figure 16:
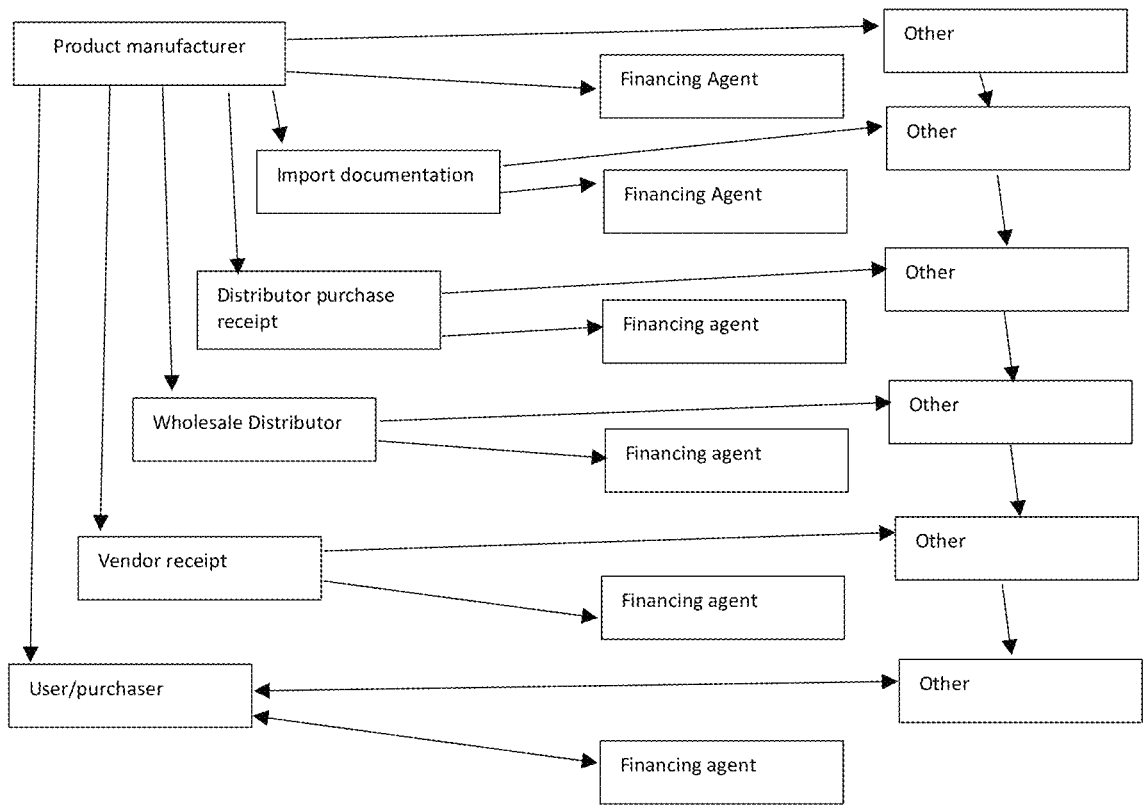
FIG. 16 illustrates an embodiment of the disclosure wherein blockchain methodology is utilized via a distributed ledger to confirm product authenticity.

FIG. 16 illustrates an embodiment of the disclosure wherein block chain methodology is utilized to ensure product authenticity. In the illustrated example, documentation of each step in a chain of transactions is displayed in a distributed ledger from the manufacturer to the user/buyer. In this manner, the authenticity of the product is traceable. If the transaction records among the various parties, e.g., importer, wholesaler, financing agent or others differ, then it is possible that the product is not authentic. It will be appreciated that authenticity is a problem with current distribution chains. Multiple suppliers of supposedly identical goods (products from a single manufacturer) are utilized.

Figure 17:
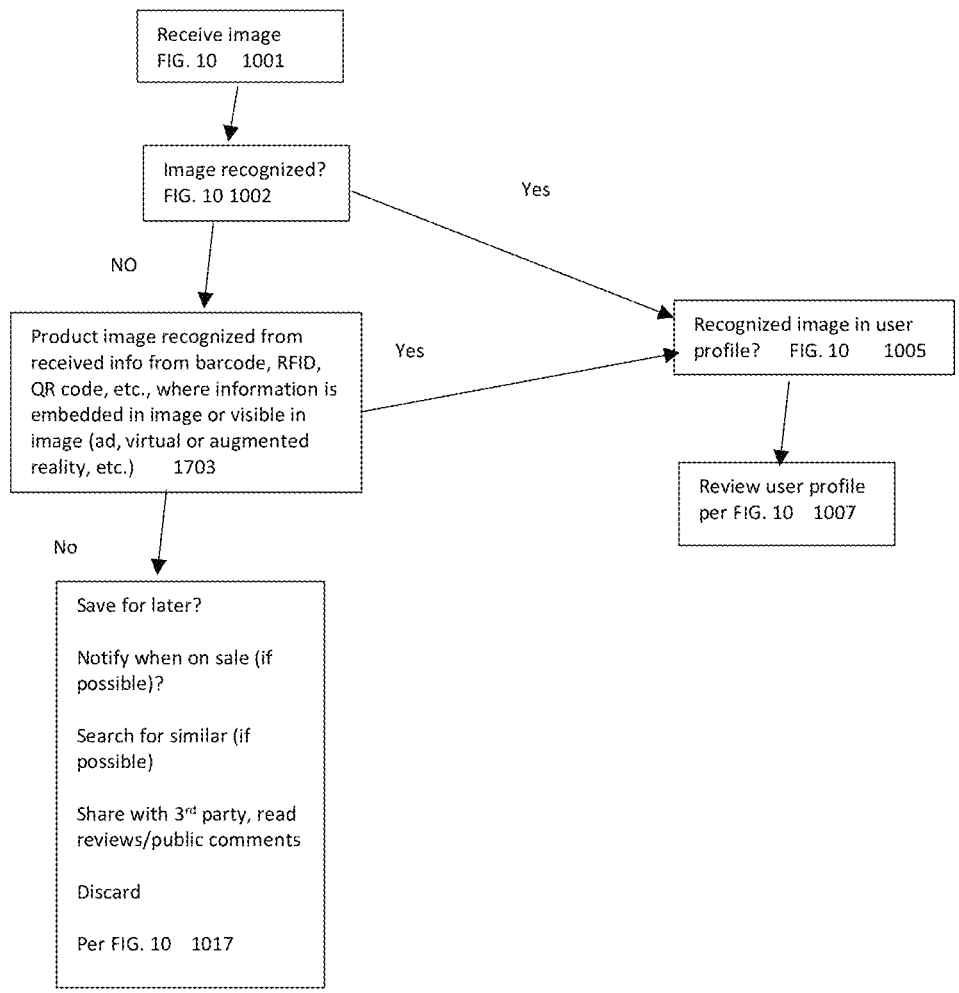
FIG. 17 illustrates an embodiment of recognizing object information.

FIG. 17 illustrates a more detailed portion of the methodology disclosed in FIG. 10 discussed above. Illustrated is the product image recognized form a barcode, RFID, QR or other code where the information is embedded in an object, an object image of an advertisement or in an image with utilization of augmented or virtual reality technology 1703.

Figure 18:
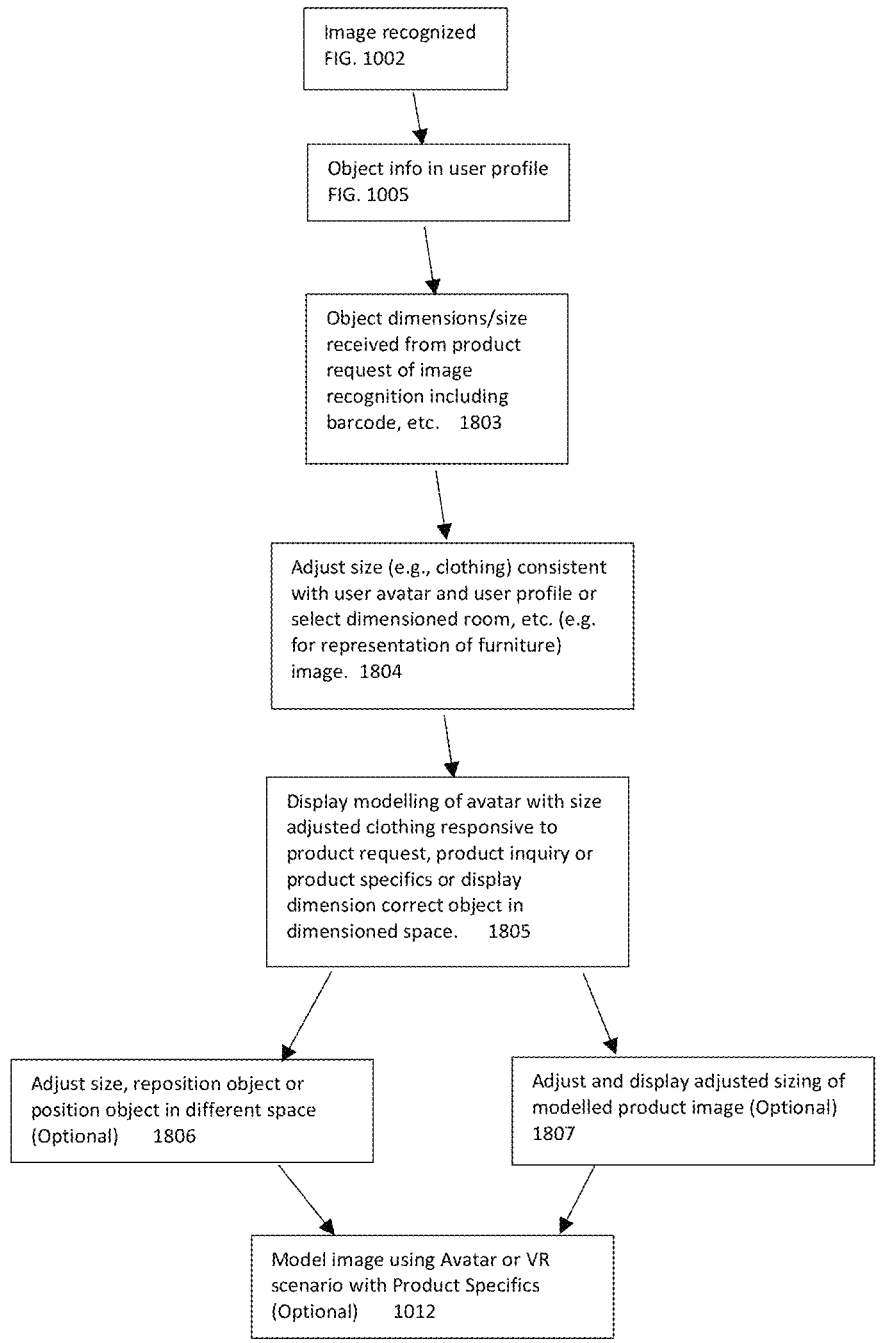
FIG. 18 illustrates a method of displaying an object of interest upon an avatar or is otherwise dimensioned in an environment or scenario utilizing inputted data and user profile.

FIG. 18 discloses further detail regarding user selection methodology utilizing contextual visualization of an object in a physical space. The object dimensions may be received from the product request as determined from codes, holograms, barcodes, QR codes, RFID, or other means discernable by virtual reality, augmented reality, non-visible light sources such infra-red lighting and image receiving devices 1803. The user's profile containing sizing or dimension information 1804 may be utilized to present or display an object on an avatar or in a contextually accurate scenario 1805. The user may manipulate the display of the object, the avatar or make further adjustments in the object display of dimensions, including differing positions in the imaged scenario 1806, 1807.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The scope of the disclosed subject matter should be determined with reference to the appended claims, along with the full scope of equivalents to which such claims are entitled. In the appended claims, the terms "including" and "in which" are used as the plain-English equivalents of the respective terms "comprising" and "wherein."

Other Embodiments

Other possible embodiments include:

Embodiment 1: A Virtual Stylist, Decorator, Coach, and the like where preferences are input by the user, updated via past purchases and/or using any time of artificial intelligence to update current trends, products, and the like. Such Virtual Assistants can place products or services in user's virtual world to consider. This can include push notifications, etc.

Embodiment 2: Stylist, Decorator, Instructor, Coaching, or other Consulting, Education or Services including: Real people, Virtual people, AI driven 'people', Bots (push or pull), Chats (push or pull), or any other communications (email, text, messenger, app's, NOWW shopping application, etc.) (push or pull). The service goes beyond just advice on colors, styles, shapes, diets, materials, locations to include virtual product education (more detailed), like how to tie a tie; what type of shoe to wear with skinny jeans; how to change a tire; one tap purchasable (as a group) recipes or social media based on dietary preferences, etc. Such people can push (suggest) or products or services in user's virtual world to consider. Instead of Google to search these things, purchased items or preferences are searched.

Embodiment 3: Borrow items for a fee as a rental or a subscription service of new items where preferences are input by the user, updated via past purchases through machine learning, deep learning, neural networks, compared and updated via AI to update current trends, products, and the like and approved by the user for third parties.

Embodiment 4: Sell or trade items or services peer to peer both (through the NOWW shopping application) or otherwise such as facilitated through virtual interaction of the shared showroom feature. This may include buying or selling new and used items and services, borrowing or renting items, or trading items or donating items. This embodiment may include a virtual closet or 'shared showroom' for such transactions and/or an invitation into a virtual closet in an Environment or the user's virtual world (revocable at any time where after other information in the environment is blocked) or public (store's) virtual world/store.

Embodiment 5: Purchases can be made agnostically and instantly (via NOWW shopping application) and any product, anywhere including: Websites, Apps, Stores, Kiosks, Store windows, Notifications (push such as ioT and/or geofencing), TV Commercials, TV Shows, Infomercials, Movie or any other type of film, Streaming content, Videos (of any kind), Gaming, Social media posts (organic, i.e., non-ad or user posts/content), Social media ads, Digital print ads, Print ads (newspaper, magazine, paper or digital), Catalogues, other advertisements or content (billboards, buses, benches, subways, cabs, etc.), and the like. As discussed previously, items from multiple vendors may be purchased simultaneously through NOWW shopping application's agnostic shopping cart.

Embodiment 6: "Inventors Studio" or "Empire" where a user may: create new product ideas, create new service ideas, or become an idea generator where brand vendors get consumer ideas and feedback for freebies, coupons or create or suggest adaptions of existing products via feedback forum where feedback or other methodology where feedback goes directly to the vendor (not just in a review), and they request where new features or explain non-working aspects (changes needed) on existing products or services; do focus groups for brands with friends for free product, etc., (virtual parties, surveys, chats, etc.); and where if adopted as a new product or feature, the consumer can share profits with Vendor, brand, retailer, company, etc.

Embodiment 7: Virtual shopping of existing (bricks & mortar) stores
   a. From NOWW shopping application;
   b. Through VR;
   c. Through AR;
   d. Through mixed reality;
   e. Any other way of product identification; and
   f. Applying all other application features (like virtual try, view or try-on) from there.

Embodiment 8: Doing the above described embodiments Business to Business (B2B) format via a separate but related application (different front-end but that uses the same or similar back-end).

(Load the Application) The NOWW Retail Shopping Platform & Marketplace may be built partly or entirely on Blockchain, Hedera Hashgraph (HH), ArkBlock/Blocklet, sidechains, or other distributed ledger technology. It may also operate on alternative Internet or other on-line protocols. NOWW is a Consumer and Business purchasing Application/s with an agnostic shopping cart that can instantly index and identify any product or service seen anywhere and convert it into an order, including groups of related, or unrelated products from different vendors, identified anywhere. After purchase, NOWW shopping application aggregates orders by-vendor on the back end via a NOWW Vendor Portal and may provide services for brand onboarding and PaaS and/or SaaS (Platform as a Service and/or Software as a Service) to enable vendors to transition and/or to transact via the application/s. Use of Blockchain, sidechains, or any other distributed ledger technology may be combined in any form for this process or one or more parts of the shopping supply chain including, but not limited to the following ways:

1. Building a marketplace for consumers or businesses or both;
2. Software as a Service (SaaS) services and brand onboarding processes and procedures;
3. Business to Business (B2B) communications and supply chain information;
4. Record keeping related to the exchange of goods and services;
5. Identity protection and data safety;
6. End-to-end track and trace of products through the ingredient and manufacturing to consumer or customer stages of the supply chain;
7. Using tokens or digital currency for the exchange of goods and services between any of the constituents in the ingredients/raw materials-to-consumer/customer, supply chain;
8. For smart contracts for the exchange of goods & services between any constituents in the ingredients/raw materials-to-consumer/customer, supply chain;
9. Connecting influencers or educators to brands in a secure and transparent ecosystem that eliminates middlemen, and an option to make or eliminate payments and incentivization from the messaging;
10. Connecting influencers or educators to consumer and customers in a secure and transparent ecosystem that eliminates middlemen, and allows secure transactions to be executed between any of them;
11. Enforcing and maintaining digital copyrights of images, products, information and patents;
12. Enforcing and maintaining (verifying) the authenticity of branded products or services;
13. Enforcing and maintaining transparency in raw materials and ingredients of products/services for consumers and customers, in advance of, or after making a purchase;
14. Creating a smart contract for every product so that it is immediately identifiable;
15. Creating smart contracts between any party in the supply chain;
16. Enabling smart contract payments between any party in the supply chain; and
17. Use of the above for Supplier relationships to the Corporation itself (procurement, etc.).

(Setting up the Wallet) After loading the NOWW shopping application, the Wallet can be established for all future purchases: via any payment method:
   a. Credit card;
   b. Paypal;
   c. Apple Pay or Apple credit card;
   d. Chase pay or any other bank pay or bank transfer;
   e. Other apps such as Masterpass or Venmo, FaceBook Case, Google Pay, etc.;
   f. Generic digital currency for shopping (e.g. Bitcoin or other proprietary digital currency such as ShopCoin);
   g. Rewards (whether proprietary currency, digital or non-digital currency, vendor rewards, NOWW rewards, etc.);
   h. Coupons; and
   i. Any combo of the above.

Peer to peer shopping (via other App's or NOWW App) via wallet or via blockchain functionality (Setting up the Profile) User creates a profile and begins by populating with Friends from any source, including:
   a. Social media;
   b. Email;

c. Text;
d. NOWW algorithm suggestion;
e. Outside App (FaceBook, etc.) Suggestion;
f. proprietary code where the NOWW shopping application creates unique codes for each user (to connect in the app or for payment); and
g. the like.

(Setting up Preferences in the Profile) User preferences are added to the profile, where:
a. Preferences can be added by User immediately and can be changed or updated;
b. Preferences may be updated via AI and machine learning, deep learning, neural networks, algorithms, NLP, vision (where prompted) and personalized algorithms can be created;
c. Preferences can be updated by an approved outside party (stylist, interior designer, coach) when approved by User; and
d. Trends, Education or Updates are updated (where function is activated by User) and categories can be selected or de-selected.

(Ultra-Personalizing the profile) User can create Avatars (aka likenesses, or scans of self and others in the close circle (e.g., spouse, kids, dog, rooms) either via a NOWW shopping application-initiated scan, or a scan done through a $3^{rd}$ party, or via User input) where the Avatars or scans are:
a. Real likenesses;
b. Rendered likenesses;
c. 3D;
d. 4D;
e. Motionable;
f. Virtual Reality;
g. Augmented reality;
h. Mixed reality;
i. Gamified (do a Ted talk; race Usain Bolt; and the like);
j. May be audible or sensory;
k. Scans can be rooms (layout of kitchen, garage;
l. Scans can be environments (inside refrigerator, inside garage shelving, etc.);
m. Can include preferred products that are scanned into an Environment Lists:
 1. user can scan, search or create lists of preferred products (e.g., grocery list);
 2. Can create purchasable scan lists by category;
 3. Using computer vision or machine vision;
 4. Can create wish lists
n. Can create sub-Virtual Worlds that can be exported into another's (for example, a child's) own NOWW shopping application;
o. Can create a Shared Showroom (personal or business) showing items for sale, borrow, or trade;
p. Can create a Virtual Closet or other sub-environments that may allow $3^{rd}$ party access;
q. Can enable NOWW algorithms to learn their closet/virtual closet and make suggestions on possible selling or coordination, i.e., "this goes with that" or the like;
r. Any of the above can be populated in a User or Sub-User's 'virtual world' which can be updated at any time:
 18. Either by user or user input;
 19. AI or machine learning, deep learning, neural networks, algorithms; or
 20. Outside party (where permitted).
Dimensions of anything in (e.) can be manually input by the User (instead of scanned);
A preference algorithm can be created (prompted by NOWW shopping application) where the user chooses things like color families, size preferences, vendor preferences, ingredient elimination (or inclusion) and other preferences (or via exclusion);
Preference algorithms can be added for anyone in one's application, such as a child, husband, dog, or the like;
a. Wish list capability with or without Avatar population;
b. Subscription election:
c. To borrow or rent selected items for a fee
d. To purchase selected items for a fee at intervals with automatic shipping
e. To borrow or rent curated (real or robo-curated) items for a fee
f. To purchase curated (real or robo-curated) items for a fee
g. To sell, trade or borrow items peer to peer
h. To obtain Services such as coaching, personal training, consulting, and the like
i. To enable information or education from any available category
j. Magazines (digital or paper)
k. Other (such as a podcasts, blogs, YouTube channels or products or services as mentioned)

(Initiating a Purchase in NOWW) The user can buy anything they see anywhere, (without being launched to a website or outside application) instantly via:
a. The NOWW shopping application or website;
b. A NOWW camera buy button on devices;
c. NOWW messaging via:
d. NOWW Text
e. NOWW email
f. NOWW messenger bot
g. NOWW messenger IM (and all social media DM)
h. NOWW commercial or infomercial
i. NOWW video
j. NOWW chat
k. NOWW bot
l. Any other messaging (Buy anything purchasable from anywhere on NOWW) Buy instantly on NOWW shopping application (without being launched to an outside website i.e., non NOWW) with any of the following devices:
a. Computer;
b. Phone;
c. Tablet;
d. PDA;
e. Virtual devices or environments;
f. Wearables or other devices;
g. VR environment or world;
h. AR environment or world;
i. "spatial internet" or other protocols;
j. Car;
k. Speaker;
l. iOT; and
m. any other device.

(Buy from the NOWW shopping application 'in the wild') without being launched to an outside website or app, such as:
a. From a (on a) person, place or thing;
b. In a person's house, room, cabinet or the like;
c. By scanning an item, document, application, or the like;
d. From a store window;
e. In a retail store;
f. Via virtual shopping (VR or other virtual store);
g. From an Event;
h. From an Office;
i. From a Business (if the user is a Business);

j. Via scan, including:
   21. Taking a photo,
   22. image recognition, and
k. embedded code (Proprietary or standard, e.g., bar or QR, etc.).

Buy from the NOWW shopping application via media without being launched to an outside website or app, including:
   a. from a print advertisement of any kind;
   b. from a digital advertisement of any kind;
   c. from a TV show or TV commercial or TV infomercial;
   d. from streamed shows, services or ads;
   e. from a movie or film or trailer;
   f. from a video game or promotion;
   g. from a catalog (print digital or virtual);
   h. from billboards and all other media (such as buses, benches, cabs, and the like);
   i. a radio or satellite or other auditory advertisements;
   j. via an Internet search (with the NOWW shopping application watermark or code);
   k. from social media content or ads; and
   l. from any content or ad.

Buy from the NOWW shopping application via social media without being launched to an outside website or app including via a watermark, embedded image, or the like, including:
   a. from an advertisement
   b. from an identifiable code (real or virtual, i.e., augmented reality, etc.)
   c. from an organic post (or any organic/user created content);
   d. from a share;
   e. from a tag;
   f. from a comment or social media response;
   g. from a Messenger message or direct message or snap (any social media);
   h. from a chat bot enabled via social media (or any other way such as auditory prompt);
   i. from social media; and
   j. from any other way people communicate such as tweet, direct message, and the like.

Buy instantly via NOWW shopping application via communications w/o being launched to an outside website or app (both push and pull) such as:
   a. Email;
   b. Text;
   c. Messenger and other messaging/social media;
   d. Notifications (from any device or source); and
   e. Any other communications.

(Buy with the NOWW shopping application):
   a. via a scanned item/s in the application;
   b. via scanned groups in the application (e.g., apple pie recipe/group of ingredients);
   c. via Looks or groups of coordinated products or services;
      1. can be self-scanned looks (scan a person's outfit and NOWW shopping application will find the products),
      2. can be looks suggested upon checkout that coordinate with a purchased or planned purchased item,
      3. can be pushed looks or ensemble suggestions based on a subscription,
      4. can be user requested looks solicited by search or bot query (e.g., what goes with this tablecloth?);
   d. via any type of search in the application or website (e.g., search, bot request, chat, scans);
   e. via a pushed, suggested or shared game;
   f. via any type of share;
   g. via a notification of any type (social media, ioT, geofencing, text, etc);
   h. via the user's or a friend's virtual world;
   i. via suggestions by a vendor, a friend or NOWW shopping application;
   j. when permitted by a user or user-solicited;
   k. via an upsell such as a combination of items that compliment the item being purchased;
   l. via AI, machine learning, deep learning, neural networks, or other intelligent recommendations based on past preferences or selected preferences;
   m. via a Virtual/Robo Assist (e.g., Stylist, Decorator, Instructor);
   n. via an outside $3^{rd}$ Party Assist (with permission) within the application;
   o. via an auditory request or command;
   p. via a Shared Showroom (user's or another's own items for sale, trade or borrow);
   q. via pushed Vendor offers & specials (where user permits);
   r. via a virtual closet; and
   s. via peer to peer.

(Buy from another person on the NOWW shopping application) without being launched to an outside website or app: (may or not be on blockchain, etc.) and the other person is paid as an advertiser or "micro-advertiser";
   via scanning or transmitting something in the other person's NOWW shopping application account;
      a. via a shared game;
      b. via mutual friends' suggestions;
      c. via that person's Shared Showroom (that user's own items for sale, rent, or trade (peer to peer));
      d. via a scan in the wild;
      e. via any method of communication including directly from the purchased item itself;
      f. via a Virtual World visit;
      g. via requests for opinions on the purchased product or friend recommendations; and
      h. all other ways listed (e.g. business to business).

Buy from the NOWW shopping application in other ways, e.g., other NOWW shopping application-initiated purchases with or without being launched to an outside app:
   a. NOWW purchase via a NOWW or non-NOWW User-initiated bot query;
   b. NOWW purchase via a NOWW or non-NOWW bot (pushed notification or bot subscription);
   c. NOWW purchase via a NOWW or non-NOWW messenger, direct message, social media message, and the like (push or pull);
   d. NOWW purchase via a NOWW or non-NOWW chat or website request (push or pull);
   e. Anywhere a NOWW product or service identification code can be detected;
   f. Scannable searches (e.g., do a Google search for flashlight and scan to buy in NOWW shopping application); and
   g. Directly from a Shared Showroom:
      5. Person-to-person,
      6. Person-to-business and vice versa,
      7. Business-to-Business,
      8. Directly from a Virtual World, and
      9. Via virtual reality, augmented reality or mixed reality.

(NOWW Product/Service search, identification and indexing): In the NOWW shopping application, products and or services can be identified from any device (as listed above) via:

a. In-application search (or in-website search) or populated categories (shoes, etc.);
b. any type of image recognition;
c. taking a photograph or image;
d. auditory or sensory prompt or command;
e. notifications, including internet of things notifications;
f. geofencing notifications;
g. Other notifications;
h. an embedded code (proprietary or standardized) including a virtual code, e.g., virtual reality, augmented reality, machine readable;
i. a proprietary code/s;
j. known codes:
  1. QR,
  2. EAS,
  3. Bar code,
  4. RFID or smart-RFID,
  5. Blockchain ID (or any distributed ledger derivative technology),
  6. Smart codes (instantly purchasable), and
  7. Any other protocol.
k. calling a non-local image, code or product database;
l. calling a public open API database or image bank;
m. calling a vendor's database;
n. calling a NOWW or local database;
o. any other method discussed above, including texted, emailed, shared, and the like.

(NOWW Shopping Universe) Items being 'bought' can be anything, including:
a. Products;
b. Services;
c. business products (e.g., wood, office supplies, machines, etc);
d. charitable contributions, (e.g., round up for charity, tithes);
e. deposits or withdrawals into and from bank or digital currency (or any other transactional currency) accounts;
f. resold items or services;
g. peer to peer items or services;
h. subscription services (of products or services);
i. consulting services including but not limited to:
  1. coaching (e.g., golf, diet coaching, self-help, etc.),
  2. stylist or interior decoration,
  3. consulting,
  4. education, and
  5. any other services or products; and
  6. content and other subscription services.

NOWW Business procurement shopping which may be a separate dedicated application; items (e.g. procurement by businesses) where the "Customer" can be a:
a. Business or a consumer;
b. Where such purchases also take place through an agnostic shopping cart;
c. Where the process can be on Blockchain (et al) or any distributed ledger technology;
d. Where orders will be routed to the NOWW vendor platform for completion or fulfillment by Vendors where orders can be multiple vendors orders simultaneously; Where previous orders can be saved for reorder, or where communications or offers can be pushed or pulled.

NOWW back-end includes a marketplace or NOWW Vendor Platform (order sorting and/or routing marketplace) and other technologies to enable mass agnostic order processing.

NOWW back-end also includes a proprietary or non-proprietary (or any) combination of services/processes to "onboard" vendors or enable vendors to transact on NOWW. Some of these include SaaS or PaaS, including:
a. enterprise software services;
b. marketplace services;
c. vendor platform for order routing (proprietary and as a service);
d. product and brand digitalization;
e. image and object recognition and enablement;
f. photography, image and film and augmentation of any kind, including 3D and 4D;
g. catalog (digital or paper) digitalization and/or augmentation;
h. application creation services, including augmented view applications;
i. Internet of things (ioT) services;
j. AR services, including augmented catalog (digital or print augmentation);
k. VR services;
l. Data mining and business intelligence services;
m. Business process automation services;
n. Chat bot, chat or other messaging services;
o. Messaging and notifications services (for application, website, etc.);
p. Virtual touch services;
q. Omni-channelization platform services;
r. Mobile commerce or mobile augmented commerce services;
s. Ecommerce, mobile commerce and/or augmented commerce platform services;
t. Design your own" or other product customization option services for:
  1. NOWW products,
  2. NOWW vendor products,
  3. NOWW retailer products, and
  4. NOWW business services customers;
u. Geofencing services; and
v. Any other software and non-software services including Blockchain, or any type of distributed ledger technology (or combination thereof) either for:
w. brands, vendors,
x. or retailers (digital or brick & mortar) online or off,
y. consumers, and
z. other businesses.

NOWW Checkout: once a product or service is identified, any of the following (or any combination thereof) can happen:
a. Check for availability through any method (integration, API, etc.)
b. If not available, offer to search for similar items;
c. Instant purchase option in NOWW app (using wallet or one-tap ordering, etc.)
d. Re-purchase (of previously purchased products) or lists;
e. Intelligent purchase via algorithm or history based or suggested (recommended size or preference-driven purchase is put in cart & purchased);
f. Authenticated purchase (NOWW algorithm compares the product in the cart to the original and authenticates it as 'real' or 'fake') and may prompt for more (such as option to search the supply chain for origin of components or manufacturing methods (such as fair trade) etc.;
g. Search for similar items;
h. Check for peer to peer availability and or new or used availability of the item;

i. Virtual try-on via any method including (but not limited to):
   1. AR,
   2. VR,
   3. Virtual world avatar,
   4. Still photo or in-motion,
   5. From multiple angles (3D, 4D),
   6. Avatar or real person likeness, and
   7. In action;
   8. Contextual
j. VR experience of item;
k. Delivery options may be optioned (where available by vendor, such as instantly via and instant delivery service, or via traditional shipment options). This may also happen after via vendor/fulfiller;
l. Delivery options are selected if it's a NOWW product or service;
m. Item (svc) can be saved to a wish list:
   1. To buy for later
   2. To share (ask for opinions or recommendations) either via:
      i. Text
      ii. Email
      iii. Messenger or any other social media messaging apparatus or application
      iv. Airdrop or other device to device mechanisms
      v. Any other way people communicate (chat bots, etc.)
      vi. By invitation into user's 'Virtual World, or Shared Showroom'.
      vii. The identifying 'code' can be scanned from person A application to person B who, if they buy or save, person A is paid as 'advertiser or affiliate' if:
         A. Shared
         B. Purchased
         C. Shared & purchased by someone else
         D. Saved
   3. Can be saved to a wish list in multiple types of classifications as discussed previously;
      View reviews of the product (from Friends only or Universe, or both) and authenticated as a real review; share and ask opinions:
   4. via invitation into a user's 'virtual world' or shared showroom,
   5. via in-app messaging or bots, and
   6. via any of the other options identified above;
      See a look of related or complementary products or services (upsell):
   7. From the same vendor purchasing the item from, and
   8. From a mix of vendors based on preferences, trends & purchasing habits and personalized shopping algorithms
   9. From a scan or photo;
   10. Request customization options from a vendor;
   11. Create their own products in their Inventor Studio; and Gifts and Smart Gifts as below.
(NOWW Post-Order execution) once order is executed, the user may:
   a. Share purchasable link with friends in all manners described above (social media, text, etc.);
   b. Ask advice from friends about the product;
   c. Share to social media with NOWW icon or other code or icon or method (to public);
   d. Share any other way with NOWW icon;
   e. Play games with friends or other NOWW Users for incentives, freebies, coupons or points/rewards;
   f. Save to share later (to a list);
   g. Post a review;
   h. Send to a virtual world or Shared Showroom;
   i. Request a customization option;
   j. Create a custom version and can share with vendor;
   k. Partner with Brands, Vendors or Retailers (when prompted or through influences, etc) on paid collaborations;
   l. Add to (or create) a quick re-order list;
   m. Add to (or create) Subscription options (auto-ship), etc., and
   n. Add Gift or Smart Gift
(Purchase a gift on NOWW shopping application), including:
   a. Intelli-gift purchase of the correct size, color or other characteristic (e.g., gluten free, etc.) (based on that user's preferences, algorithms or input);
   b. Wish list purchasing (buying item on that User's wish list):
      1. Where the item is identified (visible/made viewable to Friends),
      2. Where the item is not identified (at the User's request) but still purchasable, (hidden) and
      3. Use Intelli-buy for (a) or (b) (Intelli-wish);
   c. Where only preferred vendors are populated (or blacklisted vendors are blocked);
   d. Where proposed gifts can be sent for virtual try-on or adjustment in advance;
   e. Through an invite into a Virtual World or Shared Showroom;
   f. By sending or redeeming ShopCoin or Rewards;
   g. Via an AI assistant who makes suggestions based on machine learning, AI and updates continuously; and
   h. Or any other way as outlined above.
(Data Aggregation) including any method or combination of technologies such as:
   a. AI, machine learning, deep learning, neural networks, NLP, vision, blockchain et al, and other distributed ledger technologies:
   b. Purchases;
   c. Returns;
   d. Shares;
   e. Influences;
   f. Preferences;
   g. Rewards accumulated;
   h. Rewards paid;
   i. Advertisements;
   j. Micro-advertisers
   k. Any other data mined by NOWW shopping application that is offered;
   l. Aggregate and/or repurpose data:
      1. For self,
      2. For Vendors,
      3. For industry,
      4. For Retailers,
      5. For Influencers,
      6. For NOWW users, and
      7. For anyone else.
(Vendor Forum) Create unprecedented communications and information flow between:
   a. Vendors and their consumers:
      1. Opportunities to solicit product feedback via an inside channel,
      2. Opportunities to send and receive customization requests, 3. Opportunities to review ideas for commercialization,
4. Opportunities to do focus groups, and
5. Opportunities to strike deals w/'advertisers';
b. Consumers and Vendors;
c. Vendors to Vendors;
d. NOWW to Vendors;
e. NOWW to Consumers;
f. Vendors to Suppliers and vice versa; and
g. NOWW to Supplier and vice versa.

What is claimed is:

1. A non-transitory computer-readable storage medium storing instructions to cause one or more processors to facilitate a profile for online transaction such as accessing or creating an account, connecting with another entity, the exchange of data and purchasing, through a user-specific profile,
said user-specific profile comprising profile and purchasing information and payment methods are collected and accessible by said users said user-specific profile may be shielded from third-party access and collection;
said user is capable of allowing third party access and data collection based on permissions given by user comprising the instructions of:
collecting user specific data on a database;
said user specific database comprising said user profile with one or more of: purchasing preferences, identification, identification verification, previous search terms, contacts previous purchases, preferences for a brand or brands, a style or styles, a color or colors and fabric or fabrics, sizing information, allergies, dietary restrictions, past preferences, purchasing history user's reviews, payment methods and user's listing of acceptable vendors;
said data collection and gathered data permissions by user to be accessible or shielded from third party collection;
receiving an account, connection or product request, said user's profile information, or a combination thereof, from a user-initiated search;
identifying a product, said user's profile information, or a combination thereof based on said product request;
obtaining a product together with said user's profile;
accessing said stored user profile database data associated with a specific user;
applying an image recognition algorithm or code to analyze said image to identify a target product, object or objects;
transmitting, over a network, a request for profile, product, or a combination thereof, information from one or more vendors based on the identified target object;
receiving said product information or profile information, or a combination thereof, over said network;
said product information identifying a product from the one to a plurality of vendors, agnostically, wherein no vendor account is required to make a connection, purchase or to conduct a transaction, and no vendor or product source is favored;
said vendors may be selected via one or more of the following:
through general search engine queries;
from a local database of vendor information;
from user preferred vendors;
from vendors supplying previous purchases;
from vendor supplied product information;
from a list of pre-screened vendors;
based on vendor location and distance from user;
based on product information received from a vendor in response to the product request by referencing a user's profile;
or a combination thereof;
receiving over the network, authentication or identification data associated with the profile or product; further selecting vendors based at least in part on product availability, cost, discount information, said user's purchasing history, by user selection or a combination thereof;
comparing an identifier associated with the image to the authentication data to confirm authenticity of the target object as corresponding to the product from the one to a plurality of vendors;
determining product parameters based on said user profile information of the user profile and product availability from a selected vendor of one or more vendors via application of a machine-learned model to said received product information for the user and availability from a selected vendor of the one to a plurality vendors;
presenting for display to the user, the product information and the determined product parameters from selected vendors;
receiving a confirmation to purchase a vendor product in response to receiving the confirmation;
initiating a transaction from the user-specific profile to purchase the vendor product having the determined product parameters; and
transmitting purchasing information from a user wallet housing said payment method stored in the profile information to a vendor to be retrieved by a transaction system of the selected vendor for product purchase and delivery.

2. The non-transitory computer-readable storage medium of claim 1, wherein the instructions cause the one or more processors to obtain an image comprising instructions to capture images from a real world environment, a graphical image of the product from an advertisement, television advertisement, print advertisement, digital or display advertisement, article, book, or show, movie, recorded or streamed content a photo, a textual representation, a readable code, embedded marker, a standardized or graphical code, or via spatial computing, virtual world or representative of the product or a link or post from a social media site or sponsored posting.

3. The non-transitory computer-readable storage medium of claim 2, wherein the instructions to cause the one or more processors to analyze said image comprise instructions comprising:
recognizing multiple objects within the image or receiving an audio input signal;
applying natural language processing (NLP) to the audio input signal to generate an NLP output indicating recognized speech in the audio input signal; and
selecting the target object from the multiple recognized objects as corresponding to the recognized speech in the audio input signal.

4. The non-transitory computer-readable storage medium of claim 1, wherein the instructions to cause the one or more processors to transmit the request for the product information comprise instructions to request the product information based on an identified target object, collected user data and a user profile wherein said target object is made identifiable to a vendor or vendors but said user data and user profile remain shielded from said vendors based on, or subject to, user permission or permissions
said permissions exhibiting levels of permission;
said levels of permission based on user's sharing preferences.

5. The non-transitory computer-readable storage medium of claim 1, wherein the instructions to cause the one or more processors to analyze the image comprise instructions to:
   identify a unique icon/marker, icon or marker in the image; and
   evaluate the unique icon/marker, icon or marker to identify the target object, aid in identification or authentication of a product, facilitate a purchase or a combination thereof using said user profile.

6. The non-transitory computer-readable storage medium of claim 5, wherein the unique icon or marker comprises a QR code, bar code, a proprietary code, maker's mark or label, embedded codes, RFID tag, microcomputer, hologram, virtual code, augmented reality code, or a combination thereof.

7. The non-transitory computer-readable storage medium of claim 1, wherein the instructions to cause the one or more processors to present the product information for display to a vendor or vendors comprise instructions to:
   obtain, from the user profile, an image of a modeling environment for modeling a vendor product; and
   generate a modeled image of the vendor product overlaid or displayed on or in the modeling environment; and present the modeled image with product information.

8. The non-transitory computer-readable storage medium of claim 7, wherein the image of the modeling environment comprises an image of a contextual environment associated with the user profile.

9. The non-transitory computer-readable storage medium of claim 8, wherein the image of the modeling environment comprises an image of a human subject, an avatar, avatars or a contextualized image or images associated with the user profile.

10. The non-transitory computer-readable storage medium of claim 7, wherein the instructions to cause the one or more processors to present the product information for display to a user comprises instructions to:
   generate an augmented reality, a virtual reality or mixed reality view of the vendor product overlaid on or in the modeling environment.

11. The non-transitory computer-readable storage medium of claim 1 wherein identity and data safety, including a user's profile, is stored on Blockchain technology, Hedera Hashgraph (HH), ArkBlock/Blocklet, sidechains, or other distributed ledger technology to
   secure and control access to user-specific information stored on a user's profile or digital wallet as opposed to a central server, cloud source or distributed vendor server or source.

12. The non-transitory computer-readable storage medium of claim 1 wherein Blockchain, Hedera Hashgraph ArkBlock/Blocklet, sidechains, or other distributed ledger technology is utilized to confirm product authenticity may be verified through a distributed ledger.

13. A method to facilitate online and mobile purchasing through a user-specific profile and purchasing platform wherein a user's profile, method of payment, purchasing history and purchasing information is collectable and accessible by user, permissible to third parties by user and sharable with third parties by user, comprising:
   collecting by user user-specific data;
      said user specific data comprising a user profile with one or more of identification, verification, purchasing preferences, previous purchases, previously used search terms, preferences for brand(s), color or colors and fabric or fabrics, style or styles, sizing information, allergies, dietary restrictions, past preferences, purchasing history, vendor discount information, vendor reward information, payment methods, user's reviews and user's listing of acceptable vendors;
   said user collected and gathered data shielded from third party collection unless permissioned by said user;
   said user capable of sharing data to third parties via said permission from user's profile;
      said user profile comprising inputted data collected and gathered user data;
      establishing and maintaining user specific data on a profile, purchasing or other platform separate from vendor-controlled platforms, accounts, webpages, vendor applications, vendor databases, vendor cloud, vendor advertisements and device applications;
receiving from user a product request obtaining an image or images,
   said image or images derived through image capture or image recognition from a real-world environment, a social media site, a bot request, a spatial computing request, virtual world request, an ioT request, a photo, image recognition, a QR code, a bar code, chip, blockchain chip, a voice command, an RFID input or scan, a touchscreen input, a keyboard input, audio input, or a unique icon associated with the product in a database;
accessing a stored user-specific profile associated with a user comprising profile information associated with a user;
applying an image recognition algorithm to analyze the image to identify a target object;
transmitting, over a network, a request for product information from said one to a plurality of vendors based on the following:
   single, multi-brand and/or marketplace-status of vendors;
   general search engine queries, local database queries, preferred vendor queries, bot requests, previous purchases, vendor's product information, a list of pre-screened vendors, vendor location and distance from user, product information received from a vendor in response to the product request by referencing a user's profile or a combination thereof;
receiving the product information over said network, the product information identifying a product from the one to a plurality of vendors;
further selecting vendors based at least in part on product availability, product cost, discount information, vendor reputation, vendor whitelist/blacklist lists, user's purchasing history, by user selection or a combination thereof;
receiving over the network, authentication data associated with the vendor product;
comparing an identifier associated with the image to the authentication data to confirm availability, suitability and/or authenticity of the target object as corresponding to the vendor product from the one or more vendors;
determining product parameters based on the profile information of the user profile and availability from a selected vendor of the one or more vendors via application of a machine-learned model to;
presenting for display to the user, the product information and the determined product parameters from selected vendors;

initiating and receiving a confirmation to purchase the vendor product;

initiating, in response to receiving the confirmation, a transaction via the user profile with the selected vendor to purchase the vendor product having the determined product parameters; and electing to transmit purchasing and payment information from a user wallet, user profile data, or a combination thereof, stored in the user's profile to a vendor to be retrieved by a transaction system of the selected vendor for purchase.

14. The method of claim 13, wherein obtaining an image comprises capturing an image of a real-world environment, a graphical image of the product from an advertisement, search, bot query, television advertisement, print advertisement, digital or display advertisement, article, book show, movie, recorded or streamed content, a photo, a textual representation, a readable code, an embedded marker, a standardized or graphical code representative of the product or a link or post from a social media site, virtual, augmented or mixed reality experiential environment or sponsored posting or combination thereof.

15. The method of claim 13, wherein analyzing the image comprises:
recognizing multiple objects within the image;
receiving an audio input signal;
applying natural language processing (NLP) to the audio input signal to generate a NLP output indicating recognized speech in the audio input signal; and
selecting the target object from the multiple recognized objects as corresponding to the recognized speech in the audio input signal.

16. The method of claim 13, wherein transmitting the request for product information comprises:
transmitting a request to a vendor or vendors for product information based on the identified target object, availability of the product and verifying the object or objects against the user profile sizing and preferences to optimize purchase retention, to securitize a purchase, to authenticate user products, to optimize user suitability pre-purchase and reduce likelihood of return or exchange.

17. The method of claim 13, wherein analyzing the image comprises: identifying a unique icon or marker in the image; and
evaluating the unique icon, or marker to identify the target object, aid in identification, authentication, or a combination thereof, of a product, facilitate direct purchase of a product, or a combination thereof.

18. The method of claim 17, wherein the unique icon or marker comprises: a QR code, bar code, a proprietary code, maker's mark or label, embedded codes, RFID tag, microcomputer, chip, blockchain chip, hologram, virtual code, augmented realty code, or a combination thereof.

19. The method of claim 13, wherein presenting the product information for displaying the product information comprises:
obtaining, from the user profile, an image of a modeling environment for modeling the vendor product;
generating a modeled image of the vendor product overlaid on the modeling environment; and
presenting the modeled image with the product information.

20. The method of claim 19, wherein the image of the modeling environment comprises an image of a room, contextual environment, virtual room, or space, or a combination thereof, associated with the user profile.

21. The method of claim 20, wherein the image of the modeling environment, virtual environment, or a combination thereof, comprises an image of a person, a person's likeness, model, model of a person, avatar or avatars, or contextualized image associated with the user profile.

22. The method of claim 21, wherein said avatar may be generated by or contained within said user profile and which may be used to generate a three-dimensional or four-dimensional model for modelling within an environment of a product with said avatar or contextualized image.

23. The method of claim 13, wherein presenting the product information for display comprises:
generating an augmented reality view, virtual reality view, mixed reality view, virtual view, or a combination thereof, of the vendor product overlaid on the modeling environment.

24. The method of claim 13 facilitating online and mobile purchasing through a user-controlled profile and purchasing platform wherein Blockchain, Hedera Hashgraph (HH),
ArkBlock/Blocklet, sidechains, or other distributed ledger technology is utilized in confirming product authenticity, to trace the transit or custody steps of the product or service back to the vendor, manufacturer, or ingredients origin;
tracing origin of the item, materials, raw materials, and the like may be traced back to the vendor or manufacturer;
assessing and adjusting inventory;
sending and receiving information;
routing of orders;
payment; and
protecting and securing said user's information.

* * * * *